United States Patent
Narula et al.

(10) Patent No.: US 10,909,206 B2
(45) Date of Patent: Feb. 2, 2021

(54) RENDERING VISUALIZATIONS USING PARALLEL DATA RETRIEVAL

(71) Applicant: Business Objects Software Ltd., Dublin (IE)

(72) Inventors: Sanam Narula, Vancouver (CA); Nathan Wang, Coquitlam (CA); Pak Man Chan, Vancouver (CA); Shou-Chieh Chao, Vancouver (CA); Benny Mak, Richmond (CA); Walter Mak, North Vancouver (CA); Tsz Hong Sung, Richmond (CA)

(73) Assignee: SAP SE, Walldorf (DE)

( * ) Notice: Subject to any disclaimer, the term of this patent is extended or adjusted under 35 U.S.C. 154(b) by 42 days.

(21) Appl. No.: 16/229,608

(22) Filed: Dec. 21, 2018

(65) Prior Publication Data

US 2020/0201927 A1   Jun. 25, 2020

(51) Int. Cl.
| | |
|---|---|
| *G06F 16/957* | (2019.01) |
| *G06F 16/9038* | (2019.01) |
| *G06F 16/904* | (2019.01) |
| *H04L 12/24* | (2006.01) |
| *H04L 12/26* | (2006.01) |
| *G06F 16/901* | (2019.01) |

(52) U.S. Cl.
CPC ........ *G06F 16/9574* (2019.01); *G06F 16/904* (2019.01); *G06F 16/9038* (2019.01); *G06F 16/9024* (2019.01); *H04L 41/22* (2013.01); *H04L 43/045* (2013.01)

(58) Field of Classification Search
CPC ......... H40L 67/10; H40L 67/42; H40L 41/22; H40L 41/145; H40L 43/045; H04L 41/22; H04L 67/02; H04L 67/36; H04L 43/045; G06F 16/9574; G06F 16/9038; G06F 16/904; G06F 16/9024
See application file for complete search history.

(56) References Cited

U.S. PATENT DOCUMENTS

| | | | |
|---|---|---|---|
| 2015/0262396 A1* | 9/2015 | Devarajan | G06F 3/0486 345/440.1 |
| 2016/0092530 A1* | 3/2016 | Jakubiak | G06F 16/26 715/202 |
| 2018/0173754 A1* | 6/2018 | Kumar | G06F 16/24535 |
| 2018/0174104 A1* | 6/2018 | Schikora | G06Q 10/103 |
| 2018/0293154 A1* | 10/2018 | Giat | G06F 11/3466 |
| 2018/0336253 A1* | 11/2018 | Sekharan | G06F 12/0875 |
| 2019/0005104 A1* | 1/2019 | Prabhu | G06Q 30/02 |
| 2019/0073226 A1* | 3/2019 | Mak | G06F 3/0488 |

* cited by examiner

*Primary Examiner* — Jungwon Chang
(74) *Attorney, Agent, or Firm* — Fountainhead Law Group P.C.

(57) ABSTRACT

Some embodiments provide a program. The program receives a visualization collection definition specifying a plurality of visualizations. The program further processes a first visualization in the plurality of visualization using a main processing thread. While processing the first visualization, the program also retrieves data for a second visualization in the plurality of visualizations from a computing system using a background processing thread. After the processing of the first visualization is completed, the program further processes the second visualization using the main processing thread.

20 Claims, 11 Drawing Sheets

RENDERING VISUALIZATIONS USING PARALLEL DATA RETRIEVAL

BACKGROUND

Many different types of computing devices available today. Examples include desktop computers, servers, laptops, tablets, smartphones, video game consoles, media players, etc. Mobile computing devices such as tablets, smartphones, wearables, etc. are typically smaller in size compared to stationary computing devices (e.g., desktop computers, servers, etc.). However, due to their smaller size, mobile computing devices may have less resources (e.g., processors, memory, etc.) compared to the stationary computing devices. As such, mobile computing devices may not be able to handle resource-intensive tasks and applications that the stationary computing devices can handle.

SUMMARY

In some embodiments, a non-transitory machine-readable medium stores a program. The program receives a visualization collection definition specifying a plurality of visualizations. The program further processes a first visualization in the plurality of visualization using a main processing thread. While processing the first visualization, the program also retrieves data for a second visualization in the plurality of visualizations from a computing system using a background processing thread. After the processing of the first visualization is completed, the program further processes the second visualization using the main processing thread.

In some embodiments, the program may further storing the data for the second visualization in a cache storage. Processing the second visualization using the main processing thread may include retrieving the data for the second visualization from the cache storage and generating the second visualization based on the retrieved data for the second visualization. Retrieving data for the second visualization in the plurality of visualizations from the computing system may include generating a query for the data for the second visualization, sending the query to the computing system, and receiving the data for the second visualization from the computing system.

In some embodiments, the program may further retrieving data for the first visualization from the computing system using the background processing thread. Processing the first visualization in the plurality of visualizations using the main processing thread may include generating the first visualization based on the retrieved data for the first visualization. Retrieving data for the first visualization from the computing system may include generating a query for the data for the first visualization, sending the query to the computing system, and receiving the data for the first visualization from the computing system.

In some embodiments, the program may further, while processing the first visualization, retrieve data for a third visualization in the plurality of visualizations from the computing system using the background processing thread and, after the processing of the first visualization is completed, process the third visualization using the main processing thread. Retrieving data for the second visualization in the plurality of visualizations and retrieving data for the third visualization in the plurality of visualizations may be retrieved in a single batch.

In some embodiments, a method, executable by a mobile device, receives a visualization collection definition specifying a plurality of visualizations. The method further processes a first visualization in the plurality of visualization using a main processing thread. While processing the first visualization, the method also retrieves data for a second visualization in the plurality of visualizations from a computing system using a background processing thread. After the processing of the first visualization is completed, the method further processes the second visualization using the main processing thread.

In some embodiments, the method may further store the data for the second visualization in a cache storage. Processing the second visualization using the main processing thread may include retrieving the data for the second visualization from the cache storage and generating the second visualization based on the retrieved data for the second visualization. Retrieving data for the second visualization in the plurality of visualizations from the computing system may include generating a query for the data for the second visualization, sending the query to the computing system, and receiving the data for the second visualization from the computing system.

In some embodiments, the method may further retrieve data for the first visualization from the computing system using the background processing thread. Processing the first visualization in the plurality of visualizations using the main processing thread may include generating the first visualization based on the retrieved data for the first visualization. Retrieving data for the first visualization from the computing system may include generating a query for the data for the first visualization, sending the query to the computing system, and receiving the data for the first visualization from the computing system.

In some embodiments, the method may further, while processing the first visualization, retrieve data for a third visualization in the plurality of visualizations from the computing system using the background processing thread and, after the processing of the first visualization is completed, process the third visualization using the main processing thread. Retrieving data for the second visualization in the plurality of visualizations and retrieving data for the third visualization in the plurality of visualizations may be retrieved in a single batch.

In some embodiments, a system includes a set of processing units and a non-transitory machine-readable medium that stores instructions. The instructions cause at least one processing unit to receive a visualization collection definition specifying a plurality of visualizations. The instructions further cause the at least one processing unit to process a first visualization in the plurality of visualization using a main processing thread. While processing the first visualization, the instructions also cause the at least one processing unit to retrieve data for a second visualization in the plurality of visualizations from a computing system using a background processing thread. After the processing of the first visualization is completed, the instructions further cause the at least one processing unit to process the second visualization using the main processing thread.

In some embodiments, the instructions may further cause the at least one processing unit to store the data for the second visualization in a cache storage. Processing the second visualization using the main processing thread may include retrieving the data for the second visualization from the cache storage and generating the second visualization based on the retrieved data for the second visualization. Retrieving data for the second visualization in the plurality of visualizations from the computing system may include generating a query for the data for the second visualization, sending the query to the computing system, and receiving the data for the second visualization from the computing system.

In some embodiments, the instructions may further cause the at least one processing unit to retrieve data for the first visualization from the computing system using the background processing thread. Processing the first visualization in the plurality of visualizations using the main processing thread may include generating the first visualization based on the retrieved data for the first visualization. Retrieving data for the first visualization from the computing system may include generating a query for the data for the first visualization, sending the query to the computing system, and receiving the data for the first visualization from the computing system. The instructions may further cause the at least one processing unit to, while processing the first visualization, retrieve data for a third visualization in the plurality of visualizations from the computing system using the background processing thread and, after the processing of the first visualization is completed, process the third visualization using the main processing thread.

The following detailed description and accompanying drawings provide a better understanding of the nature and advantages of the present invention.

DETAILED DESCRIPTION

Figure 1:
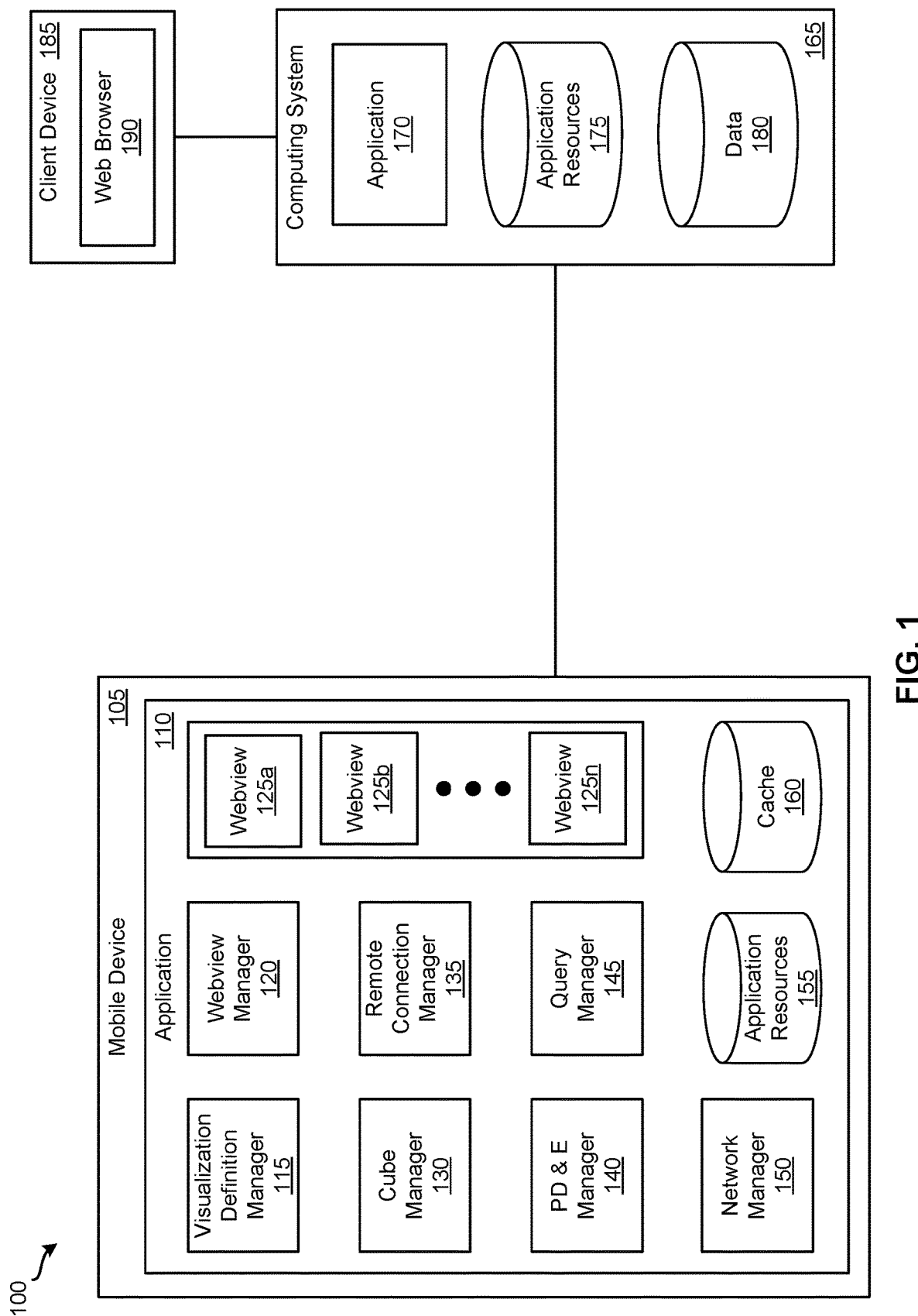
FIG. 1 illustrates a system according to some embodiments.

In the following description, for purposes of explanation, numerous examples and specific details are set forth in order to provide a thorough understanding of the present invention. It will be evident, however, to one skilled in the art that the present invention as defined by the claims may include some or all of the features in these examples alone or in combination with other features described below, and may further include modifications and equivalents of the features and concepts described herein.

Described herein are techniques for managing multi-dimensional array of data definitions. In some embodiments, a mobile device includes an application configured to render visualizations. The application may manage multi-dimensional array of data definitions used for rendering visualizations. To render a collection of visualizations of data, the application can retrieve the definition for the collection of visualizations from a computing system. Then, the application may parse through the definition for the collection of visualizations to identify distinct multi-dimensional array of data definitions used for the various visualizations in the collection of visualizations. Next, the application can retrieve the identified multi-dimensional array of data definitions from the computing system and store them on the mobile device for later use in rendering visualizations in the collection of visualizations.

In addition, described herein are techniques for rendering visualizations using parallel data retrieval. For example, a user of an application operating on a mobile device may select a collection of visualizations of data to view. In response, the application may start processing the collection of visualizations by performing operations to render several visualizations in the collection of visualizations. Concurrently with the rendering of the several visualizations, the application may retrieve data for some visualizations in the collection of visualizations that have not been rendered. As the application receives the data for the visualizations that have not been rendered, the application may continue to retrieve data for any remaining visualization that have not been rendered and for which data has not been retrieved. After rendering the first several visualizations, the application may start rendering visualizations in the collection of visualizations for which data has been already retrieved.

Described herein are also techniques for managing data for rendering visualizations. In some embodiments, the application may include a query manager that is responsible for handling all the queries for data for visualizations. For instance, when processing a collection of visualizations of data that a user of the mobile device has selected for viewing, the query manager can retrieve from a computing system data for the initial visualizations in the collection of visualizations being processed for rendering and store them in a cache storage. For visualizations in the collection of visualizations that are subsequently processed for rendering, if a particular visualization uses data that has been retrieved for a previously processed and rendered visualization, the query manager may retrieve data from the cache storage. Otherwise, the query manager may retrieve data for the particular visualization from the computing system.

Additionally, described herein are techniques for emulating functions in application resources. In some embodiments, a computing system stores application resources (e.g., Javascript files) that are configured for execution on a web browser of a client device. Some functions in the application resources can be executed by an application operating on the mobile device while other functions in the application resources cannot be executed by the application. For some of these other functions, the application can emulate them using native code. For others of these other functions, the application can emulate them using scripting code that is compliant with a defined scripting standard.

The techniques described herein provide a number of benefits and advantages over conventional methods of rendering visualizations. First, by identifying only distinct multi-dimensional array of data definitions specified in a collection of visualizations of data and retrieving the identified multi-dimensional array of data definitions, the application utilizes less network resources because conventional methods of rendering visualizations based on multi-dimensional array of data definitions may retrieve the multi-dimensional array of data definition for each visualization in the collection of visualization. This can result in retrieving duplicate multi-dimensional array of data definitions and wasteful use of network resources. Second, by retrieving data for visualizations in a collection of visualizations that have not yet been rendered while rendering visualizations in the collection of visualizations, the application renders visualizations faster because convention methods retrieve the data for each visualization when the visualization is being processed for rendering. In addition, the application is able to provide the collection of visualizations faster because convention methods render visualizations in a serial fashion. Third, by using a single query manager, the application is able to reduce the amount of memory used because conventional methods of rendering a collection of visualizations uses a separate query manager for rendering each visualization in the collection of visualizations. Furthermore, the application reduces the amount of network resources used because conventional methods of rendering visualizations in a collection of visualizations may still retrieve data from the data source for visualizations that use the same data, resulting in duplicative network calls and wasteful use of network resources.

FIG. 1 illustrates a system 100 according to some embodiments. As shown, system 100 includes mobile device 105, computing system 165, and client device 185. While FIG. 1 shows one mobile device 105 and one client device 185, one of ordinary skill in the art will appreciate that any number of additional mobile devices configured similarly to mobile device 105 and/or client devices configured similarly to client device 185 may be included in system 100.

As shown in FIG. 1, client device 185 includes web browser 190. Client device 185 is configured to communicate and interact with computer system 165. For example, a user of client device 185 may log onto and access application 170 hosted on computing system 165 via web browser 190. In response to the logon, client device 185 may receive from computing system 165, via web browser 190, application resources stored in application resources storage 175 to use for generating visualizations of data (e.g., chart visualizations such as bar charts, pie charts, line charts, scatter charts, etc.). While using application 170 via web browser 190, the user may want to view a collection of visualizations of data (e.g., data stored in data storage 180), for example, by selecting the collection of visualizations of data via a graphical user interface (GUI) in web browser 190. In response, client device 185 executes the application resources in order to retrieve data from data storage 180 for the desired visualizations of data, generate the visualizations of data, and then display (e.g., on a display of client device 185) them on client device 185.

As illustrated in FIG. 1, mobile device 105 includes application 110. Application 110 includes visualization definition manager 115, webview manager 120, webviews 125a-n, cube manager 130, remote connection manager 135, parallel data & emulation (PD & E) manager 140, query manager 145, network manager 150, application resources storage 155, and cache storage 160. Application resources storage 155 is configured to application resources. In some embodiments, the application resources stored in application resources storage 155 include the same application resources stored in application resources storage 175. The application resources stored in application resources storage 155 may be application resources packaged with application 110 when mobile device 105 downloaded application 110 (e.g., from a mobile application distribution platform). In some cases, when mobile device 105 installed the downloaded application 110, mobile device 105 unpackaged and stored the application resources packaged with application 110 in application resources storage 155. Cache storage 160 is configured to store cached data (e.g., multi-dimensional array of data definitions, data retrieved for visualizations, etc. In some embodiments, application resources storage 155 and cache storage 160 are implemented in a single physical storage while, in other embodiments, application resources storage 155 and cache storage 160 may be implemented across several physical storages. While FIG. 1 shows application resources storage 155 and cache storage 160 as part of application 110, one of ordinary skill in the art will appreciate that application resources storage 155 and/or cache storage 160 may be external to application 110 in some embodiments. Also, one of ordinary skill in the art will realize that application resources storage 155 and/or cache storage 160 can be external to mobile device 105 in some embodiments.

Visualization definition manager 115 is configured to manage visualization collection definitions. In some embodiments, a visualization collection definition specifies a set of visualizations. For each visualization in the set of visualizations, the visualization collection definition specifies a visualization definition. A visualization definition can specify a type of visualization, a data source, a unique identifier (ID) associated with a multi-dimensional array of data, a set of measures from the multi-dimensional array of data for the visualization, metadata describing the layout of the visualization (e.g., legends, labels, font types, font sizes, background images, etc.). Optionally, a visualization definition can also specify a set of dimensions from the multi-dimensional array of data for categorizing the set of measures, a set of filters for the visualization, etc. A visualization collection definition can specify other information as well. For instance, a visualization collection definition may specify metadata describing the layout of the collection of visualizations (e.g., font types, font sizes, background colors, background images, the layout of the set of visualizations, etc.), global filters for the set of visualizations, etc.

In some instances, application 110 may receive from a user of mobile device 105 a selection of a collection of visualizations for viewing. In response, application 110 sends visualization definition manager 115 a request for a visualization collection definition associated with the selected collection of visualizations. Upon receiving the request, visualization definition manager 115 retrieves the visualization collection definition from computing system 165 (e.g., by sending the request to computing system 165 and, in response, receiving the visualization collection definition from computing system 165). Then, visualization definition manager 115 sends the visualization collection definition to cube manager 130.

Webview manager 120 is configured to manage webviews 125a-n. For example, webview manager 120 may receive a request to process a collection of visualizations from remote connection manager 135. In response, webview manager 120 retrieves the definition for the collection of visualizations from visualization definition manager 115. Webview manager 120 then parses the visualization collection definition and instructs webviews 125a-n to generate visualizations of data in the collection of visualizations. For instance, webview manager 120 can send a webview 125 a visualization definition for a visualization and a request to generate the visualization to the webview 125. In some embodiments, a particular webview 125 is able to generate one visualization of data at a time. In some such embodiments, webview manager 120 instructs each webview 125 to generate a visualization of data. When a webview 125 is finished with generating a visualization of data, webview manager 120 instructs the webview 125 to generate another visualization of data that has not yet been generated.

In some cases, webview manager 120 ensures that only a defined number (e.g., two, three, five, etc.) of webviews 125a-n are concurrently generating visualizations. For example, webview manager 120 may instruct three webviews 125 to each generate a visualization. When webview manager 120 receives a notification from a webview 125 indicating that the webview 125 has finished generating a visualization, webview manager 120 may instruct a webview 125 (the same webview 125 or a different webview 125) to generate a visualization if there are any visualizations left in the collection of visualizations that have not been generated (e.g., visualizations that have not been sent to a webview 125 for processing).

While webviews 125 are generating visualizations, webview manager 120 may concurrently send PD & E manager 140 requests to retrieve data for visualizations in the collection of visualizations that have not yet been generated. For example, webview manager 120 may identify visualizations in the collection of visualizations that have not yet been generated (e.g., visualizations that have not been sent to a webview 125 for processing) and send PD & E manager 140 the visualization definitions of the identified visualizations along with a request to retrieve data for the visualizations. Webview manager 120 can receive notifications from PD & E manager 140 indicating that a request for data for a particular visualization has been sent. In some embodiments, webview manager 120 ensures that PD & E manager 140 is processing requests for data for a defined number (e.g., three, five, ten, etc.) of visualizations. For example, webview manager 120 may send PD & E manager 140 request to retrieve data for three visualizations. When webview manager 120 receives a notification from PD & E manager 140 indicating that a request for data for a particular visualization has been sent, webview manager 120 identifies another visualizations in the collection of visualizations that have not yet been generated and sends PD & E manager 140 the visualization definition of the identified visualization along with a request to retrieve data for the visualization.

Webview manager 120 is also configured to manage visualizations for which data has been retrieved. For instance, webview manager 120 can receive notifications from query manager 145 that data for visualizations have been retrieved. When webview manager 120 instructs a webview 125 to generate a visualization in the collection of visualizations and there is a visualization in the collection of visualizations that has not yet been generated and for which data has been retrieved, webview manager 120 selects the visualization and instructs the webview 125 to generate the visualization. If there are no visualizations for which data has been retrieved, webview manager 120 selects a visualization in the collection of visualizations that has not yet been generated from and instructs the webview 125 to generate the visualization.

Accordingly, webview manager 120 manages and tracks which visualizations in the collection of visualizations are being processed by webviews 125a-n, which visualizations in the collection of visualizations have been processed by webviews 125a-n, which visualizations in the collection of visualizations have had requests to retrieve data sent to PD & E manager 140, which visualizations in the collection of visualizations have data ready, etc.

Each of webviews 125a-n is configured to generate a visualization of data. In some embodiments, each webview 125 is an object configured to display web content. Webviews 125a-n may also be referred to as webview objects. In some embodiments, each webview 125 is executed on a main processing thread (also referred to as a user interface (UI) thread). A webview 125 can receive from webview manager 120 a definition for a particular visualization of data and a request to generate the particular visualization of data. In response, the webview 125 can retrieve application resources stored in application resources storage 155 and execute the application resources in order to generate the particular visualization of data. In some embodiments, the application resources include functions for rendering the particular visualization of data and presenting the particular visualization of data (e.g., on a display of mobile device 105). To generate the visualization of data, the webview 125 sends query manager 145 the definition for the particular visualization of data and a request for data for the visualization. When the webview 125 receives the data for the visualization, the webview 125 executes the application resources, which causes the webview 125 to render the visualization based on the data retrieved for the visualization and present the visualization of data. Once a webview 125 has completed generating a visualization, the webview 125 sends webview manager 120 a notification indicating that it has finished generating the visualization.

Cube manager 130 is responsible for managing multi-dimensional array of data definitions. For example, cube manager 130 can receive a visualization collection definition from visualization definition manager 115. As mentioned above, a visualization collection definition may specify a set of visualizations and a set of visualization definitions for the set of visualizations. Each visualization definition may specify, among other things, a data source, and a unique ID associated with a multi-dimensional array of data. Once cube manager 130 receives the visualization collection definition, cube manager 130 parses it to identify all the distinct IDs of multi-dimensional arrays of data specified in the visualization definitions of the visualization collection definition. Next, cube manager 130 sends application 170 the identified IDs along with a request for the definitions of the multi-dimensional arrays of data associated with the IDs. In return, cube manager 130 receives definitions of the multi-dimensional arrays of data associated with the IDs. Then, cube manager 130 stores them in cache storage 160.

In some embodiments, a visualization collection definition specifies a set of ordered pages (e.g., page 1, page 2, page 3, etc.). Each page in the set of ordered pages specifies a set of visualizations. In some such embodiments, cube manager 130 processes the visualization collection definition on a page-by-page basis. For instance, cube manager 130 may parse the visualization collection definition to identify all the distinct IDs of multi-dimensional arrays of data specified in the visualization definitions of a first page of the visualization collection definition. Cube manager 130 then sends application 170 these identified IDs along with a request for the definitions of the multi-dimensional arrays of data associated with the IDs. When cube manager 130 receives definitions of the multi-dimensional arrays of data associated with the IDs from application 170, cube manager 130 stores them in cache storage 160. Next, cube manager 130 continues to parse the visualization collection definition to identify all the distinct IDs of multi-dimensional arrays of data specified in the visualization definitions of a second page of the visualization collection definition. Cube manager 130 sends application 170 the identified IDs along with a request for the definitions of the multi-dimensional arrays of data associated with the IDs. Upon receiving definitions of the multi-dimensional arrays of data associated with the IDs from application 170, cube manager 130 stores them in cache storage 160. Cube manager 130 continues to process the visualization collection definition in this page-by-page manner until no pages remain.

When identifying distinct IDs of multi-dimensional arrays of data specified in the visualization definitions of a particular page of the visualization collection definition, cube manager 130 takes into account IDs of multi-dimensional arrays of data specified in pages that have already been processed. For example, cube manager 130 can remove any IDs identified in previous pages of the visualization collection definition from the IDs identified in the particular page in order to prevent requesting duplicate definitions of multi-dimensional arrays of data. For instance, assuming cube manager 130 had identified IDs of multi-dimensional arrays of data A, B, and D from a first page of a visualization collection definition and cube manager 130 had identifies IDs of multi-dimensional arrays of data E, B, F, and G from a second page of a visualization collection definition, cube manager 130 would remove the ID for multi-dimensional array of data B and only send application 170 the IDs for multi-dimensional arrays of data E, F, and G.

Once cube manager 130 has retrieved definitions of multi-dimensional arrays of data specified in the visualization collection definition, cube manager 130 sends the definitions of multi-dimensional arrays of data to remote connection manager 135. In the case where the visualization collection definition specifies a set of ordered pages, cube manager 130 sends the definitions of multi-dimensional arrays of data specified in the first page after cube manager 130 has retrieved the definitions of multi-dimensional arrays of data.

Cube manager 130 also handles requests for definitions of multi-dimensional arrays of data. For instance, cube manager 130 may receive from a webview 125 a request for a definition for a particular multi-dimensional array of data. In response to such a request, cube manager 130 accesses cache storage 160, retrieves the definition for the particular multi-dimensional array of data, and sends it to the webview 125. Cube manager 130 can handle similar requests from query manager 145 in the same way.

In some embodiments, a user of application 110 may select an option to refresh a visualization collection that is being presented to the user. In response, application 110, sends cube manager 130 a request to refresh definitions of multi-dimensional arrays of data used for visualizations in the visualization collection. In response to the request, cube manager 130 sends application 170 a request for the definitions for these multi-dimensional arrays of data that have been updated. If cube manager 130 receives any updated definitions of the multi-dimensional arrays of data, cube manager 130 updates the respective definitions stored in cache storage 160 with the updated definitions.

Remote connection manager 135 is configured to manage connections to remote data sources. For example, remote connection manager 135 can receive a set of definitions for multi-dimensional arrays of data for a collection of visualizations of data from cube manager 130. In some embodiments, a definition for a multi-dimensional array of data specifies a set of measures, a set of dimensions, and a flag indicating whether or not the data source on which the multi-dimensional array of data is stored is a remote data source. After receiving the definitions for the multi-dimensional arrays of data, remote connection manager 135 iterates through each definition and determines whether the multi-dimensional array of data is stored in a remote data source based on the flag specified in the definition for the multi-dimensional array of data. If the flag indicates that the multi-dimensional array of data is stored in a remote data source, remote connection manager 135 may prompt the user of application 110 for credentials (e.g., a username and a password) to log into the data source. Otherwise, remote connection manager 135 continues processing any remaining definitions. After iterating through all the definitions for definitions for the multi-dimensional arrays of data for the collection of visualizations of data, remote connection manager 135 sends webview manager 120 a request to process the collection of visualizations.

PD & E manager 140 is responsible for handling requests to retrieve data for visualizations of data. For example, PD & E manager 140 can receive from webview manager 120 a set of visualization definitions for a set of visualizations of data and a request to retrieve data for the set of visualizations. In response to the request, PD & E manager 140 sends query manager 145 the set of visualization definitions and the request to retrieve data for the set of visualizations. In some embodiments, PD & E manager 140 sends query manager 145 one visualization definition and request at a time. For instance, PD & E manager 140 may send query manager 145 a first visualization definition in the set of visualization definitions and a first request to retrieve data for a first visualization, then send query manager 145 a second visualization definition in the set of visualization definitions and a second request to retrieve data for a second, visualization, then send query manager 145 a third visualization definition in the set of visualization definitions and a third request to retrieve data for a third visualization, etc. PD & E manager 140 can receive notifications from query manager 145 indicating that a request for data for a visualization has been sent. In response, PD & E manager 140 forwards the notification to webview manager 120.

In some embodiments, PD & E manager 140 is a scripting engine. In some such embodiments, some or all of the operations performed by PD & E manager 140 are implemented in application resources (e.g., Javascript files) stored in application resources storage 155, which can be the same application resources stored in application resources storage 175. In some embodiments, PD & E manager 140 is executed on a background processing thread.

As explained above, the application resources stored in application resources storage 155 may include the same application resources stored in application resources storage 175, which are configured for execution on a web browser of a client device. Accordingly, some of functions includes in the application resources cannot be executed on mobile device 105. Examples of such functions include web browser application programming interface (API) functions (e.g., user agent functions, window object functions (e.g., set timeout functions, console functions, location functions, postmessage functions, etc.), functions associated with document object models (DOMs) (e.g., functions for accessing a document object in a DOM, functions for accessing an element object in a DOM, etc.), jQuery functions (e.g., jQuery deferred functions, jQuery array functions, jQuery extend functions, etc.), network functions (e.g., XMLHTTPRequest API functions), etc.

PD & E manager 140 is also configured to provide functions for emulating functions that cannot be executed on mobile application 105 (also referred to as unsupported functions). When PD & E manager 140 executes application resources (e.g., using a scripting engine) and PD & E manager detects 140 an unsupported function is accessed, PD & E manager 140 directs execution to a function configured to emulate the unsupported function. In some embodiments, a function configured to emulate an unsupported function is implemented using native code. In some cases, the reason an unsupported function cannot be executed on mobile device 110 is because the scripting code used to implement the unsupported function is not compliant with a defined scripting standard (e.g., an ES6 scripting standard) that is compatible for execution on mobile device 105. In some such cases, a function configured to emulate such an unsupported function is implemented using scripting code that is compliant with the defined scripting standard.

In some embodiments, a function configured to emulate an unsupported function is included in an API wrapper. In some such embodiments, the API wrapper is configured to perform data validation operations. For example, a particular unsupported function may have input parameters that are in a certain format (e.g., data type, order, etc.) while input parameters for a function configured to emulate the particular unsupported function that are in a different format. In such an example, the function configured to emulate the particular unsupported function is included in an API wrapper. The API wrapper is configured to convert the input parameters from the format utilized by the particular unsupported function to the format utilized by the function configured to emulate the particular unsupported function.

Query manager 145 is configured to process requests for data for visualizations. For example, query manager 145 may receive a visualization definition for a visualization and a request to retrieve data for the visualization from a webview 125. In response to such a request, query manager 145 checks whether cache storage 160 contains the data for the visualization. If so, query manager 145 sends it to the webview 125. If not, query manager 145 generates a query based on the visualization definition and sends the query to network manager 150. When query manager 145 receives the data for the visualization from network manager 150, query manager 145 sends the data to the webview 125. Query manager 145 may also store the data in cache storage 160.

Query manager 145 can also receive a set of visualization definitions for a set of visualizations and a request to retrieve data for the set of visualizations from PD & E manager 140. In response to the request, query manager 145 identifies a visualization definition in the set of visualization definitions, generates a query based on the visualization definition, and sends the query to network manager 150. Query manager 145 then sends PD & E manager 140 a notification indicating that a request for data for the visualization has been sent. Query manager 145 then iterates to the next visualization definition in the set of visualization definitions and processes it in the same manner without waiting to receive the requested data from network manager 150. When query manager 145 does receive from network manager 150 data for a particular visualization requested by PD & E manager 140, query manager 145 stores the data in cache storage 160 and sends webview manager 120 a notification indicating that data for the particular visualization has been retrieved.

In some embodiments, query manager 145 uses scripting engines to retrieve data for visualizations. For instance, for each request for data for a visualization, query manager 145 may create a scripting engine and use the scripting engine to process the request. The operations for processing the request can be implemented application resources (e.g., Javascript files) stored in application resources storage 155. These application resources can be the same application resources stored in application resources storage 175. For example, the application resources can include the set of application resources configured to perform functions for generating a query for data for a visualization. In some embodiments, query manager 145 is executed on a background processing thread. In some such embodiments, because query manager 145 is executed on a background processing thread, the application resources used to implement operations for processing the request do not include application resources that include functions related to UI operations (e.g., the set of application resources configured to perform functions for rendering the visualization of data).

Network manager 150 serves at the interface through which application 110 communicates with computing system 165. Further, network manager 150 handles requests for data for visualizations. For example, network manager 150 may receive from query manager 145 a query for data for a visualization of data. In response, network manager 150 sends the query to computing system 165. In return, network manager 150 receives results for the query and sends them to query manager 145.

As shown in FIG. 1, computing system 165 includes application 170, application resources storage 175, and data storage 180. Application resources storage 175 is configured to store application resources that include functions for accessing, using, and/or interacting with application 170, such as generating GUIs, generating or facilitating the generation of, collections of visualizations of data, performing operations in response to inputs, etc. The application resources stored in application resources storage 175 are configured for execution on web browser 190 of client device 185. Different sets of application resources are configured to perform different operations for generating visualizations. For example, one set of application resources can be configured to perform functions for generating a query for data for a visualization. Another, different set of application resources may be configured to perform functions for rendering the visualization of data. Other sets of application resources may include a set of application resources configured to perform functions for performing different operations in response to different inputs, a set of application resources configured to access a web browser and/or different elements of the web browser, etc. In some embodiments, the application resources stored in application resources storage 175 are implemented using Javascript code and, thus, are stored as Javascript files.

Data storage 180 is configured to store multi-dimensional arrays of data (e.g., online analytical processing (OLAP) data cubes). In some embodiments, a multi-dimensional array of data includes a set of measures and a set of dimensions. In some embodiments, a measure is a field that is configured to store quantitative (e.g., numeric) data and a dimension is a field that is configured to store qualitative data. Values stored in a measure can be referred to as measure values and values stored in dimensions can be referred to as dimension values. Each dimension in the set of dimensions may be configured to categorize measure values of a measure in the set of measures based on dimension values of the dimension. Data storage 180 also stores definitions for multi-dimensional arrays of data stored in data storage 180 as well as definitions for multi-dimensional arrays of data stored elsewhere (e.g., remote data sources). In some embodiments, a definition for a multi-dimensional array of data (e.g., an OLAP data cube definition) specifies a set of measures, a set of dimensions, and a flag indicating whether or not the data source on which the multi-dimensional array of data is stored is a remote data source. In addition, data storage 180 stores visualization collection definitions.

In some embodiments, application resources storage 175 and data storage 180 are implemented in a single physical storage while, in other embodiments, application resources storage 175 and data storage 180 may be implemented across several physical storages. While FIG. 1 shows application resources storage 175 and data storage 180 as part of computing system 165, one of ordinary skill in the art will understand that application resources storage 175 and/or data storage 180 may be external to computing system 165 in some embodiments.

Application 170 may be a software application operating on (e.g., hosted on) computing system 165 that may be accessed by mobile device 105 and client device 185. Application 170 may be any number of different types of applications. For instance, application 170 may be an analytics application, a data management application, a human capital management application, an enterprise management application, a customer relationship management application, a financial management application, etc.

Application 170 can process requests from mobile device 105 and client device 185. For example, application 170 may receive from client device 185 a request for application resources. In response to the request, application 170 retrieves application resources from application resources storage 175 and sends them to client device 185 so client device 185 can access, use, and/or interact with application 170. As another example, application 170 may receive requests for data for visualizations of data from mobile device 105 and client device 185. In response, application 170 may access data storage 180 to retrieve the requested data and then send the data to mobile device 105 or client device 185. Application 170 can also receive requests from mobile device 105 and client device 185 for requests for definitions of collections of visualizations of data. In response to such requests, application retrieves the requested definitions from data storage 180 and sends them to requestor (e.g., mobile device 105 or client device). In addition, application 170 may receive from mobile device 105 and client device 185 requests for definitions of multi-dimensional arrays of data. For example, application 170 may receive from mobile device 105 a set of IDs and a request for definitions of multi-dimensional arrays of data associated with the set of IDs. In response to the request, application 170 accesses data storage 180 to retrieve the definitions of multi-dimensional arrays of data associated with the set of IDs and sends them to mobile device 105. Application 170 can also receive from mobile device 105 or client device 185 a list of definitions of multi-dimensional arrays of data and a request for any of the definitions that have been updated. In response, application 170 checks data storage 180 for any such definitions and sends them to the requestor (e.g. mobile device 105 or client device 185).

Figure 2:
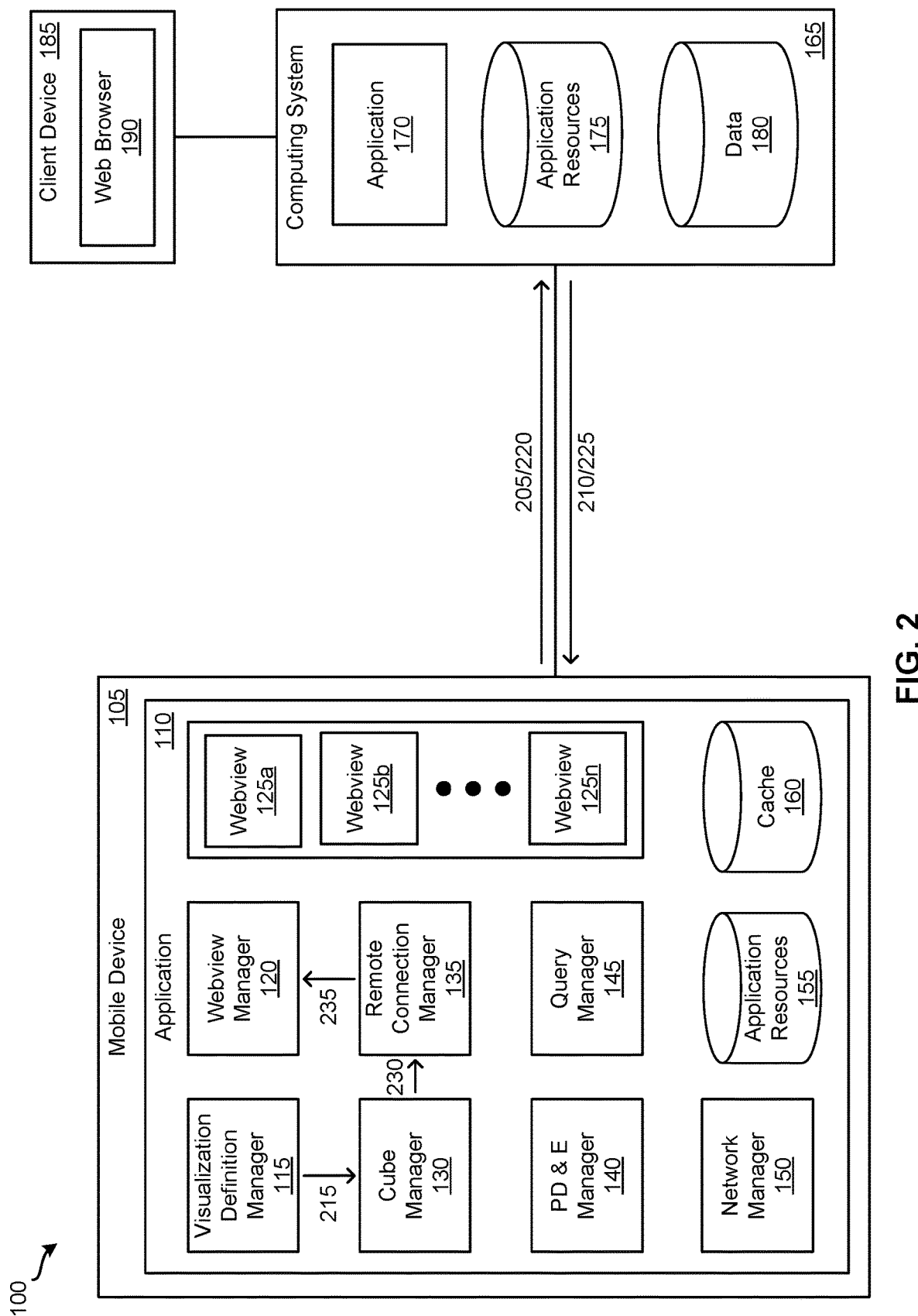
FIG. 2 illustrates an example data flow through the system illustrated in FIG. 1 according to some embodiments.

An example operation of system 100 will now be described by reference to FIG. 2, which illustrates an example data flow through system 100 according to some embodiments. In particular, the example operation is retrieving definitions of multi-dimensional arrays of data for a visualization collection definition. The example operation begins by a user of application 110 selecting a collection of visualizations to view. In response to the selection, application 110 sends visualization definition manager 115 a request for a visualization collection definition associated with the selected collection of visualizations. After receiving the request, visualization definition manager 115 sends, at 205, the request to application 170. Upon receiving the request, application 170 retrieves the visualization collection definition from data storage 180 and sends, at 210, it to visualization definition manager 115. When visualization definition manager 115 receives the visualization collection definition from application 170, visualization definition manager 115 sends, at 215, it to cube manager 130.

Upon receiving the visualization collection definition from visualization definition manager 115, cube manager 130 parses it to identify all the distinct IDs of multi-dimensional arrays of data specified in the visualization definitions of the visualization collection definition. Cube manager 130 then sends application 170 the identified IDs along with a request for the definitions of the multi-dimensional arrays of data associated with the IDs. When application 170 receives the IDs and the request from cube manager 130, application 170 accesses data storage 180 to retrieve the definitions of multi-dimensional arrays of data associated with the set of IDs and sends them to cube manager 130. After receiving the definitions of the multi-dimensional arrays of data from application 170, cube manager 130 stores them in cache storage 160. Cube manager 130 then sends, at 230, the definitions of multi-dimensional arrays of data to remote connection manager 135.

Once remote connection manager 135 receives the definitions for the multi-dimensional arrays of data, remote connection manager 135 iterates through each definition and determines whether the multi-dimensional array of data is stored in a remote data source based on the flag specified in the definition for the multi-dimensional array of data. If the flag indicates that the multi-dimensional array of data is stored in a remote data source, remote connection manager 135 may prompt the user of application 110 for credentials (e.g., a username and a password) to log into the data source. If the flag indicates that the multi-dimensional array of data is not stored in a remote data source, remote connection manager 135 continues processing any remaining definitions. After iterating through all the definitions for definitions for the multi-dimensional arrays of data, remote connection manager 135 sends, at 235, webview manager 120 a request to process the collection of visualizations.

Figure 3:
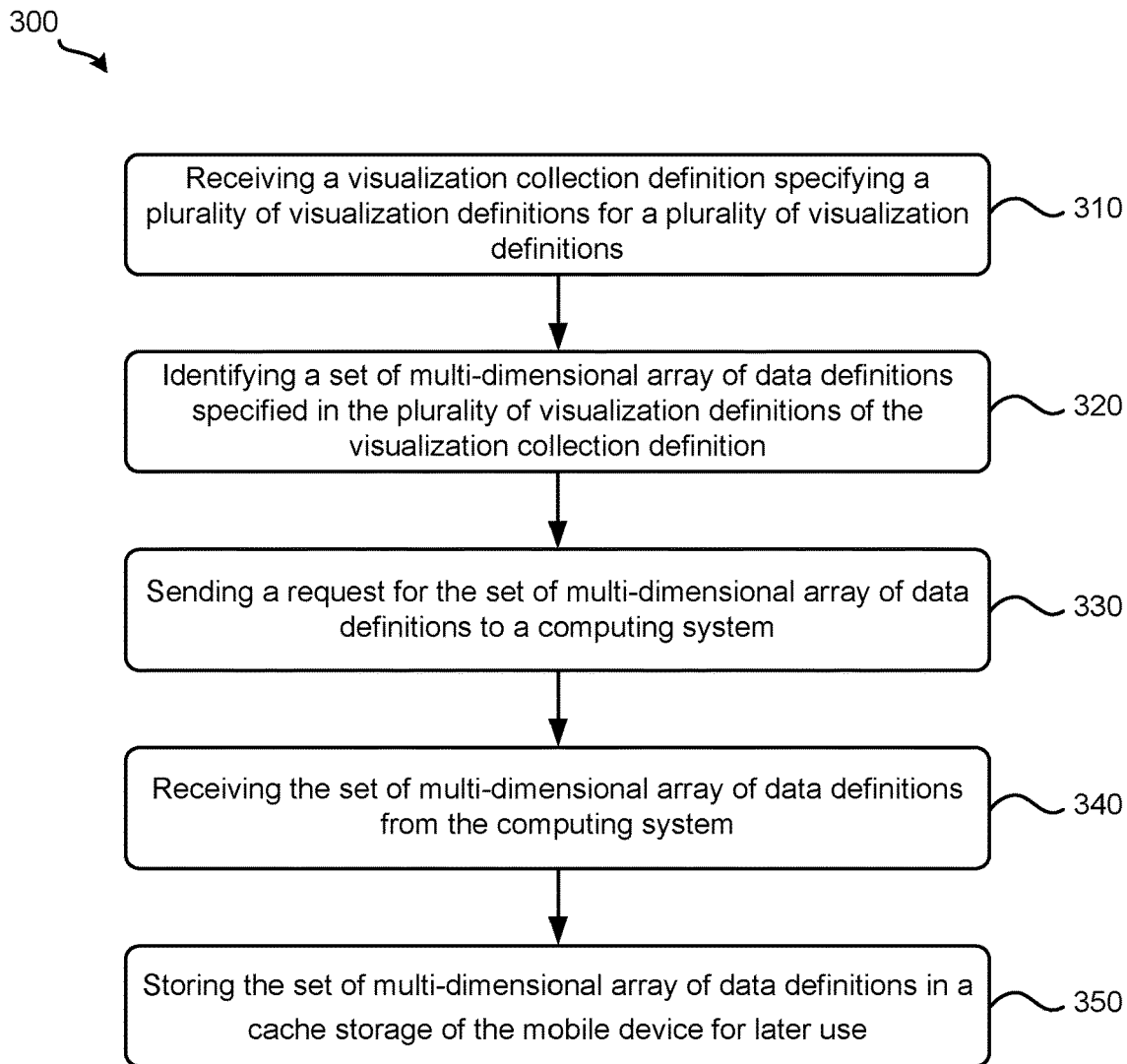
FIG. 3 illustrates a process for managing multi-dimensional array of data definitions according to some embodiments.

FIG. 3 illustrates a process 300 for managing multi-dimensional array of data definitions according to some embodiments. In some embodiments, application 110 performs process 300. Process 300 starts by receiving, at 310 a visualization collection definition specifying a plurality of visualization definitions for a plurality of visualization definitions. Each visualization definition in the plurality of visualization definitions may specify a multi-dimensional array of data definition. Referring to FIGS. 1 and 2 as an example, cube manager 130 may receive a visualization collection definition from visualization definition manager 115, which visualization definition manager 115 retrieved from computing system 165.

Next, process identifies, at 320, a set of multi-dimensional array of data definitions specified in the plurality of visualization definitions of the visualization collection definition. Referring to FIGS. 1 and 2 as an example, cube manager 130 parses visualization collection definition to identify all the distinct IDs of multi-dimensional arrays of data specified in the visualization definitions of the visualization collection definition. In some embodiments where the visualization collection definition specifies a set of ordered pages (e.g., page 1, page 2, page 3, etc.) and each page in the set of ordered pages specifies a set of visualizations, cube manager 130 parses the visualization collection definition to identify all the distinct IDs of multi-dimensional arrays of data specified in the visualization definitions of a first page of the visualization collection definition.

Process 300 then sends, at 330, a request for the set of multi-dimensional array of data definitions to a computing system. Referring to FIGS. 1 and 2 as an example, cube manager 130 sends application 170 the identified IDs along with a request for the definitions of the multi-dimensional arrays of data associated with the IDs. At 340, process 300 receives the set of multi-dimensional array of data definitions from the computing system. Referring to FIGS. 1 and 2 as an example, cube manager 130 receives the definitions for the multi-dimensional arrays of data from application 170. Finally, process 300 stores, at 350, the set of multi-dimensional array of data definitions in a cache storage of the mobile device for later use. Referring to FIGS. 1 and 2 as an example, cube manager 130 stores the definitions of the multi-dimensional arrays in cache storage 160.

Figure 4:
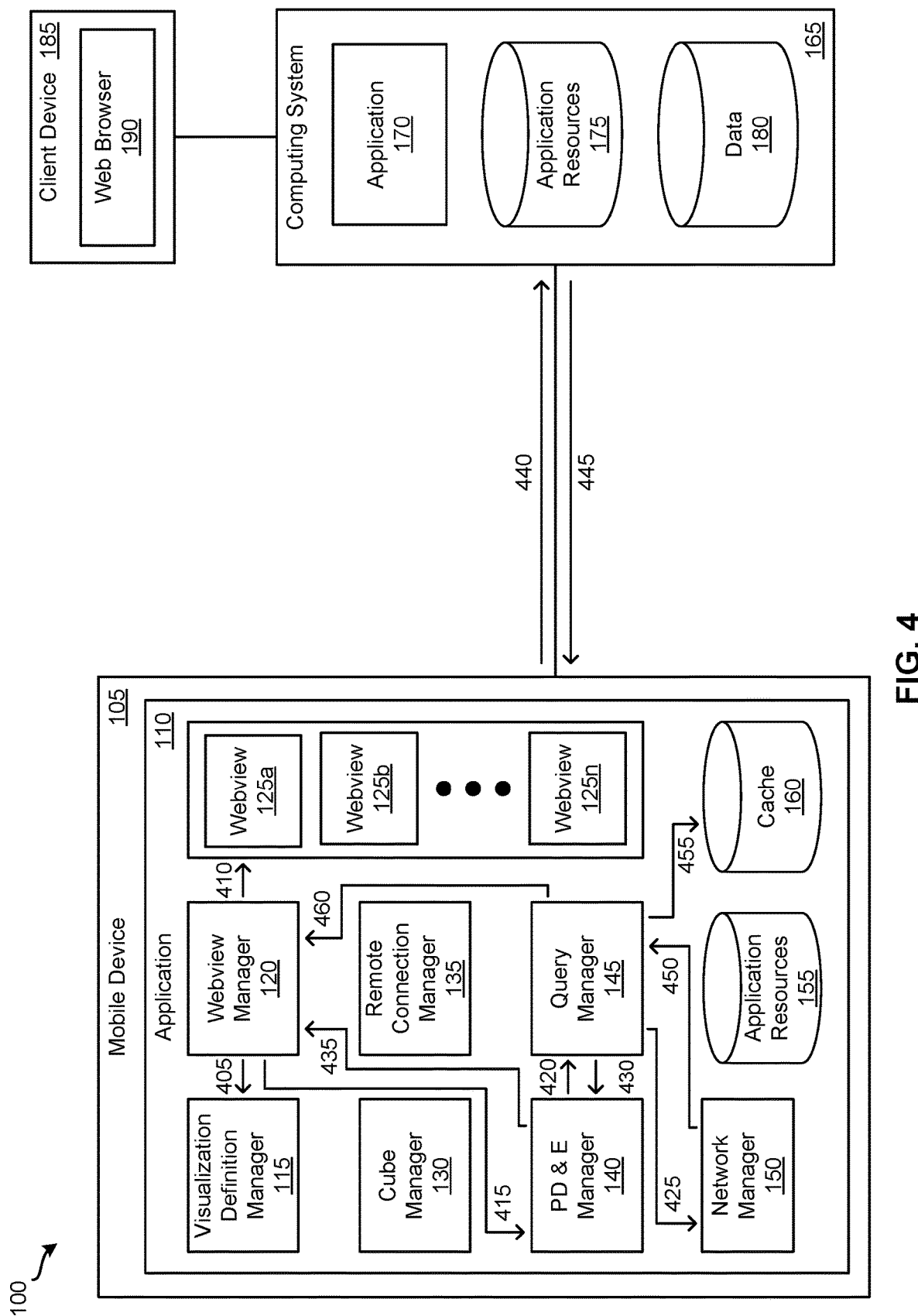
FIG. 4 illustrates an example data flow through the system illustrated in FIG. 1 according to some embodiments.

Another example operation of system 100 will now be described by reference to FIG. 4, which illustrates an example data flow through system 100 according to some embodiments. Specifically, this example operation demonstrates retrieving data for a visualizations in parallel with processing visualizations. The example operation continues from the end of the first example operation explained above. That is, remote connection manager 135 just sent webview manager 120 a request to process a collection of visualizations. In response to the request, webview manager 120 retrieves, at 405, the definition for the collection of visualizations from visualization definition manager 115. Next, webview manager 120 parses the visualization collection definition and instructs, at 410, each of a defined number (e.g., two, three, five, etc.) of webviews 125a-n to generate a visualization of data in the collection of visualizations by sending each webview 125 a visualization definition for the visualization and a request to generate the visualization.

While the instructed webviews 125 are processing visualizations, webview manager 120 concurrently sends, at 415, PD & E manager 140 visualization definitions for a defined number (e.g., three, five, ten, etc.) visualizations in the collection of visualizations that have not yet been generated (e.g., visualizations that have not been sent to a webview 125 for processing) and a request to retrieve data for the visualizations. When PD & E manager 140 receives the request and the visualization definitions, PD & E manager 140 sends, at 420, them to query manager 145. Next, query manager 145 identifies a visualization definition in the set of visualization definitions, generates a query based on the visualization definition, and sends, at 425, the query to network manager 150. Query manager 145 then sends, at 430, PD & E manager 140 a notification indicating that a request for data for the visualization has been sent. In response, PD & E manager 140 forwards, at 435, the notification to webview manager 120.

Upon receiving the query from query manager 145, network manager 150 forwards, at 440, the query to computing system 165. Computing system 165 processes the query and sends, at 445, results for the query to network manager 150, which forwards, at 450, them to query manager 145. Next, query manager 145 stores, at 455, the results for the query in cache storage 160 and sends, at 460, webview manager 120 a notification indicating that data for the particular visualization has been retrieved. After query manager 145 sends PD & E manager 140 the notification indicating that the request for data for the visualization has been sent, query manager 145 iterates to the next visualization definition in the set of visualization definitions and processes it in the same manner aforementioned in this paragraph without waiting to receive the requested data for the visualization from network manager 150.

Figure 5:
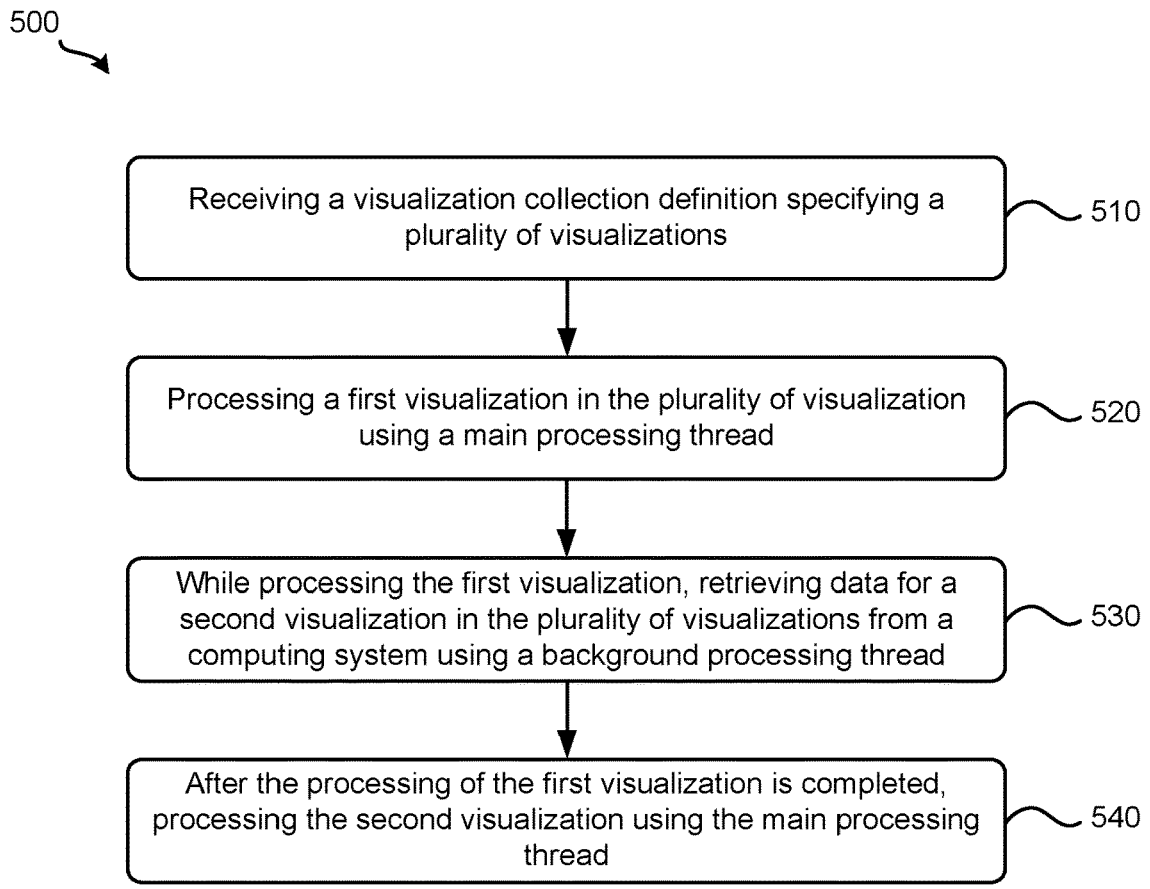
FIG. 5 illustrates a process for retrieving data in parallel according to some embodiments.

FIG. 5 illustrates a process 500 for retrieving data in parallel according to some embodiments. In some embodiments, application 110 performs process 500. Process 500 begins by receiving, at 510, a visualization collection definition specifying a plurality of visualizations. Referring to FIGS. 1 and 4 as an example, webview manager 120 may receive the visualization collection definition from visualization definition manager 115, which visualization definition manager 115 retrieved from computing system 165.

Next, process 500 processes, at 520, a first visualization in the plurality of visualization using a main processing thread. Referring to FIGS. 1 and 4 as an example, webview manager 120 parses the visualization collection definition and instructs a webview 125a-n to process (e.g., generate) a visualization of data in the collection of visualizations. Webview manager 120 can instruct the webview 125 by sending the webview 125 a visualization definition for the visualization of data and a request to generate the visualization.

While processing the first visualization, process 500 then retrieves, at 530, data for a second visualization in the plurality of visualizations from a computing system using a background processing thread. Referring to FIGS. 1 and 4 as an example, while the instructed webview 125 is processing the visualization mentioned above, webview manager 120 concurrently sends PD & E manager 140 a visualization definition for a visualization in the collection of visualizations that has not yet been generated (e.g., visualizations that have not been sent to a webview 125 for processing) and a request to retrieve data for the visualizations. Upon receiving the request and the visualization definition, PD & E manager 140 sends them to query manager 145. Next, query manager 145 generates a query based on the visualization definition and sends it to network manager 150. Network manager 150 forwards the query to computing system 165 and, in return, receives results for the query from network manager 150. Network manager 150 forwards the results for the query to query manager 145. In response to receiving the results for the query, query manager 145 stores them in cache storage 160 and sends webview manager 120 a notification indicating that data for the particular visualization has been retrieved.

Finally, after the processing of the first visualization is completed, process 500 processes, at 540, the second visualization using the main processing thread. Referring to FIGS. 1 and 4 as an example, webview manager 120 can instruct a webview 125 to generate the visualization in the collection of visualizations for which data was retrieved in operation 530. When query manager 145 receives a request for data for the visualization from webview 125, query manager 145 checks whether cache storage 160 contains the data for the visualization. In this case, cache storage 160 does have the data so query manager 145 sends it to the webview 125 for the webview to use to generate the visualization of data.

Figure 6:
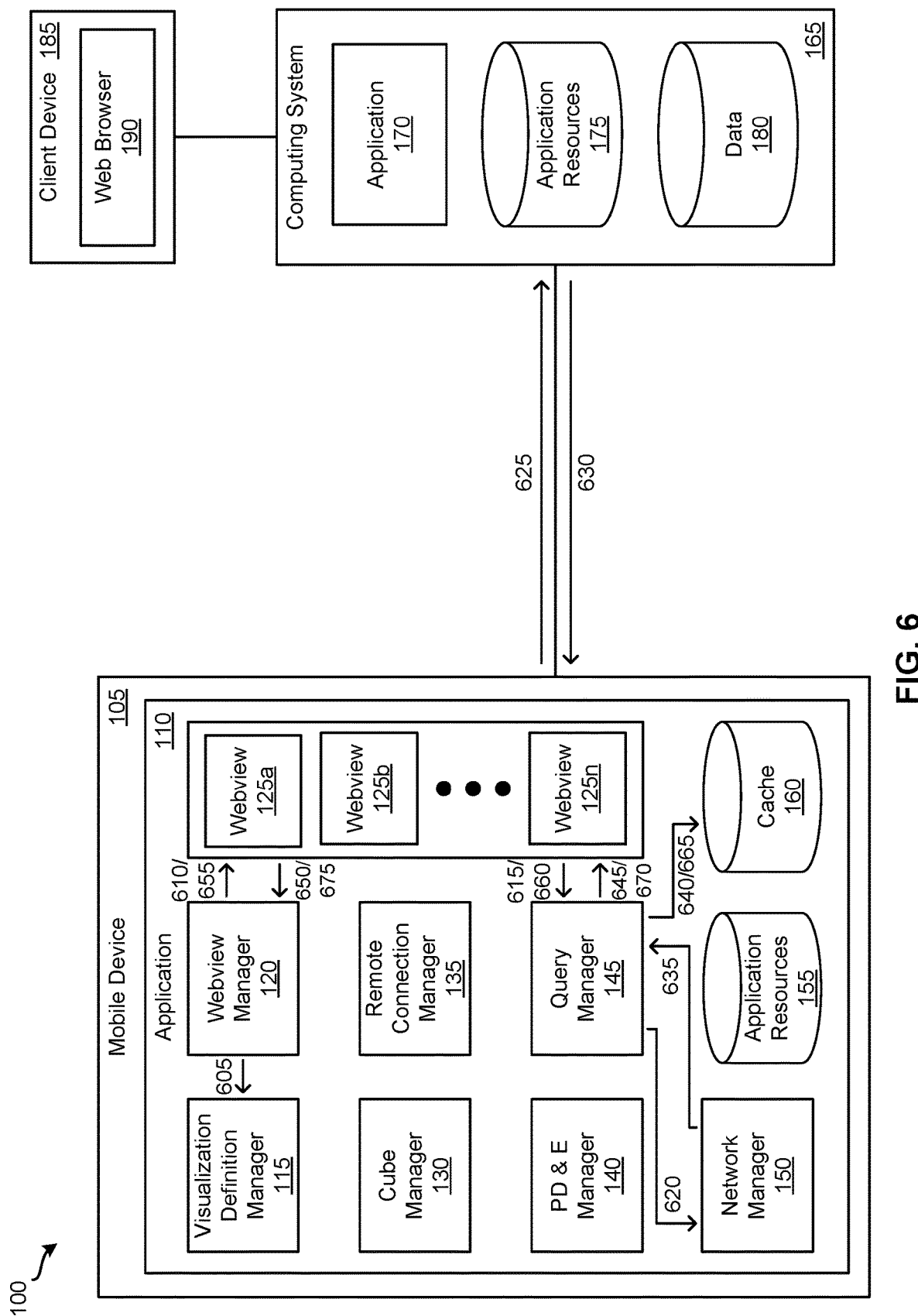
FIG. 6 illustrates an example data flow through the system illustrated in FIG. 1 according to some embodiments.

Another example operation of system 100 will now be described by reference to FIG. 6, which illustrates an example data flow through system 100 according to some embodiments. Specifically, the example operation illustrates managing data for rendering different visualizations. The example operation continues from the end of the first example operation described above. That is, remote connection manager 135 just sent webview manager 120 a request to process a collection of visualizations. In response to the request, webview manager 120 retrieves, at 605, the definition for the collection of visualizations from visualization definition manager 115. Webview manager 120 then parses the visualization collection definition and instructs, at 610, webview 125*b* to generate a visualization of data in the collection of visualizations by sending webview 125*b* a visualization definition for the visualization and a request to generate the visualization.

Webview 125*b* sends, at 615, query manager 145 the definition for the visualization of data and a request for data for the visualization. Upon receiving the definition for the visualization of data and the request from webview 125*b*, query manager 145 checks whether cache storage 160 contains the data for the visualization. In this example, cache storage 160 does not have the data. As such, query manager 145 generates a query based on the visualization definition and sends, at 620, the query to network manager 150.

When network manager 15 receives the query, network manager 150 forwards, at 625, the query to computing system 165. Computing system 165 processes the query and sends, at 630, results for the query to network manager 150, which forwards, at 635, them to query manager 145. Query manager 145 then stores, at 640, the results for the query in cache storage 160 and sends, at 645, the results for the query to webview 125*b*. Then, webview 125*b* executes the application resources configured for rendering a visualization and presenting it, causing webview 125*b* to render the visualization based on the data retrieved for the visualization and presenting the visualization of data (e.g., on a display of the mobile device 105). After generating the visualization of data, webview 125*b* sends, at 650, webview manager 120 a notification indicating that it has finished generating the visualization.

Next, webview manager 120 then identifies a visualization in the visualization collection definition that has not yet been generated (e.g., webview manager 120 has not yet instructed a webview 125 to generate it) and instructs, at 655, webview 125*n* to generate the visualization of data by sending webview 125*n* a visualization definition for the visualization in the collection of visualizations and a request to generate the visualization. Upon receiving the visualization definition and the request, webview 125*n* sends, at 660, query manager 145 the definition for the visualization of data and a request for data for the visualization.

When query manager 145 receives the definition for the visualization of data and the request, query manager 145 checks whether cache storage 160 contains the data for the visualization. For this example, cache storage 160 the definition for the visualization of data specifies the same data source and multi-dimensional array of data as the definition for the visualization previously processed by webview 125*b*. Accordingly, cache storage 160 contains the data for this visualization of data. Query manager 145 retrieves, at 665, the data (i.e., the results for the query retrieved for webview 125*b*) and sends, at 670, it to webview 125*n*. Upon receiving the data, webview 125*n* executes the application resources configured for rendering a visualization and presenting it, causing webview 125*n* to render the visualization based on the data retrieved for the visualization and presenting the visualization of data (e.g., on a display of the mobile device 105). Webview 125*b* then sends, at 675, webview manager 120 a notification indicating that it has finished generating the visualization.

In this example operation, the visualization processed by webview 125*n* used the same data as the visualization processed by webview 125*b*. If these two visualizations used different data, the same or similar operations as those described for retrieving the data for the visualization processed by webview 125*b* would be performed in order to retrieve the data for the visualization processed by webview 125*n*. Two visualizations use different data when their visualization definitions specify different data sources and/or multi-dimensional arrays of data. Two visualizations use different data when their visualization definitions specify the same data source and multi-dimensional array of data, but specify different sets of measures and/or dimensions of the multi-dimensional array of data.

Figure 7:
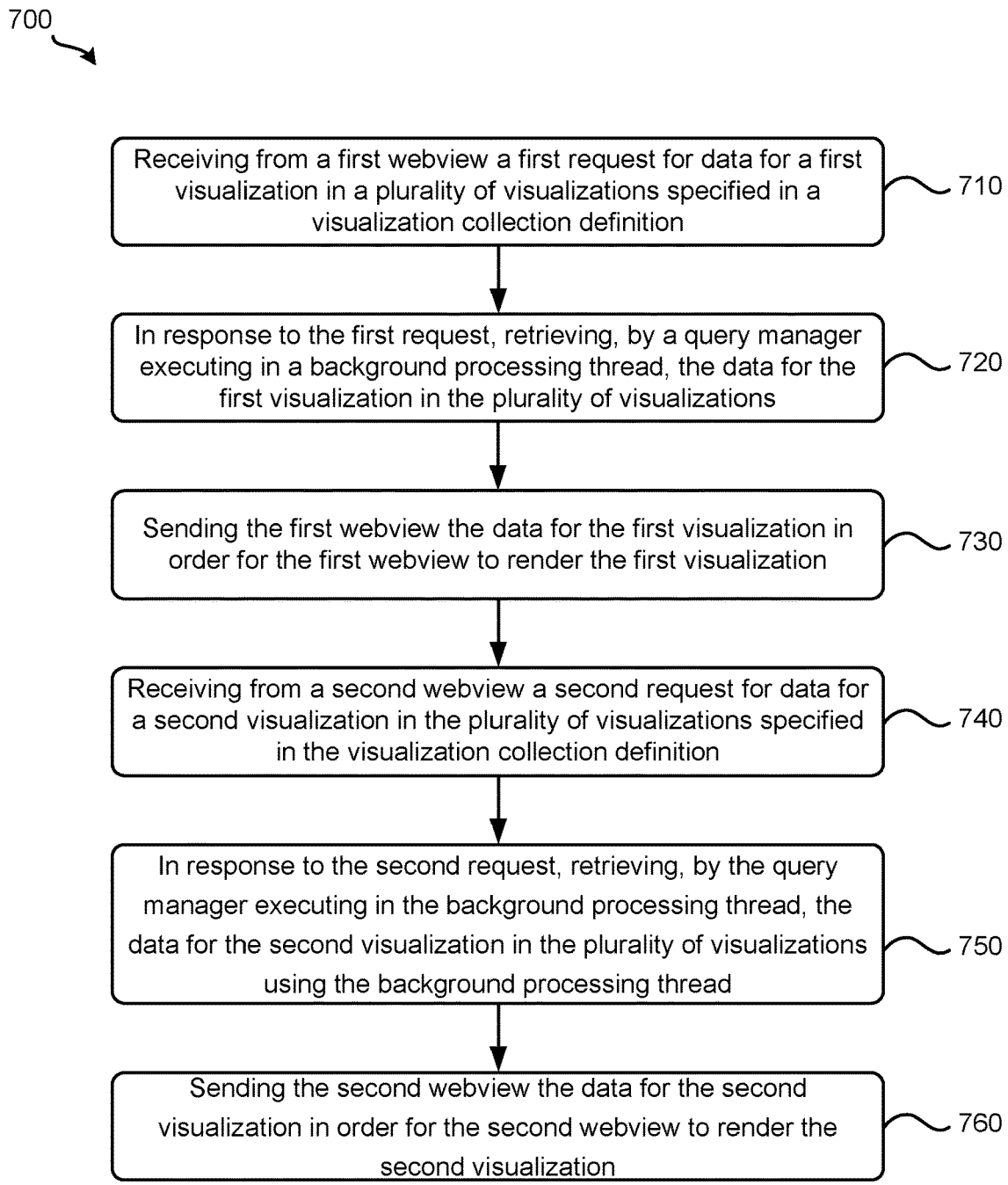
FIG. 7 illustrates a process for managing data for rendering visualizations according to some embodiments.

FIG. 7 illustrates a process 700 for managing data for rendering visualizations according to some embodiments. In some embodiments, application 110 performs process 700. Process 700 starts by receiving, at 710, from a first webview a first request for data for a first visualization in a plurality of visualizations specified in a visualization collection definition. Referring to FIGS. 1 and 6 as an example, query manager 145 may receive (e.g., at 615) from webview 125*b* a request for data for a visualization specified in a visualization collection definition.

In response to the first request, process 700 then retrieves, at 720, by a query manager executing in a background processing thread, the data for the first visualization in the plurality of visualizations. Referring to FIGS. 1 and 6 as an example, query manager 145 may retrieve the data for the first visualization by generating a query based on the visualization definition and sends it to network manager 150. Network manager 150 forwards the query to computing system 165 and, in return, receives results for the query from computing system 165. Network manager forwards the results for the query to query manager 145, which query manager 145 stores in cache storage 160.

Next, process 700 sends, at 730, the first webview the data for the first visualization in order for the first webview to render the first visualization. Referring to FIGS. 1 and 6 as an example, query manager 145 sends (e.g., at 645) the results for the query to webview 125*b*. Webview 125*b* then renders the visualization based on the data retrieved for the visualization and presents the visualization of data (e.g., on a display of the mobile device 105). Next, webview 125*b* sends webview manager 120 a notification indicating that it has finished generating the visualization.

Process 700 receives, at 740, from a second webview a second request for data for a second visualization in the plurality of visualizations specified in the visualization collection definition. Referring to FIGS. 1 and 6 as an example, query manager 145 may receive (e.g., at 660) from webview 125*n* a request for data for a visualization specified in a visualization collection definition.

In response to the second request, process 700 then retrieves, at 750, by the query manager executing in the background processing thread, the data for the second visualization in the plurality of visualizations using the background processing thread. Referring to FIGS. 1 and 6 as an example, query manager 145 may retrieve the data for the second visualization by checking whether cache storage 160 contains the data for the visualization. If so, query manager 145 retrieves the data for the visualization from cache storage 160. Otherwise, query manager 145 generates a query based on the visualization definition and sends it to network manager 150. Network manager 150 forwards the query to computing system 165 and receives in return results for the query from computing system 165. Network manager forwards the results for the query to query manager 145 and query manager 145 stores it in cache storage 160.

Finally, process 700 sends, at 760, the second webview the data for the second visualization in order for the second webview to render the second visualization. Referring to FIGS. 1 and 6 as an example, query manager 145 sends (e.g., at 645) the results for the query to webview 125*n*. In the case where the visualization being processed uses the same data as the visualization processed by webview 125*b*, query manager 145 sends webview 125*n* the same data, which query manager 145 retrieved from cache storage 160. For the case where the visualization being processed uses the different data than the visualization processed by webview 125*b*, query manager 145 sends webview 125*n* the data that was retrieved from computing system 165 by network manager 150. Once webview 125*n* receives the data for the visualization, webview 125*n* renders the visualization based on the data retrieved for the visualization and presents the visualization of data (e.g., on a display of the mobile device 105). Webview 125*n* then sends webview manager 120 a notification indicating that it has finished generating the visualization.

Figure 8:
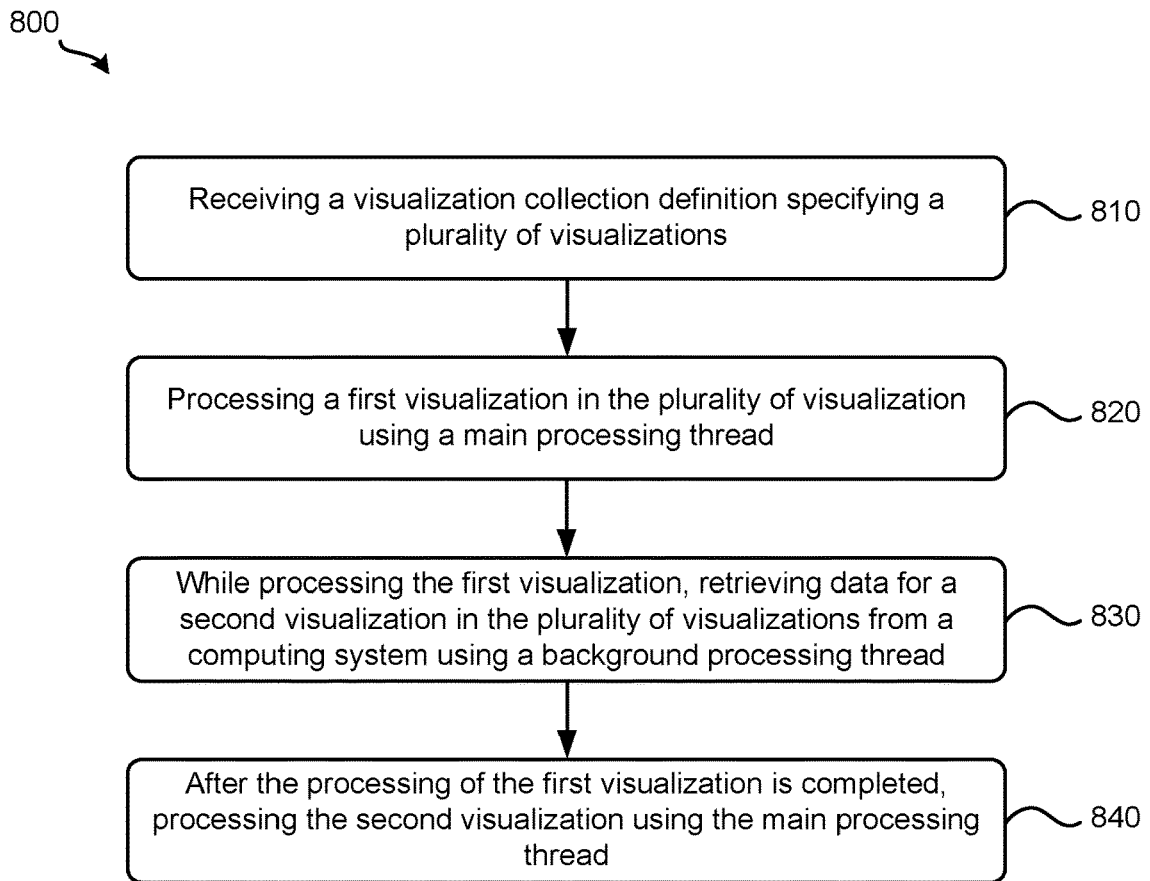
FIG. 8 illustrates a process for emulating functions in application resources according to some embodiments.

FIG. 8 illustrates a process 800 for emulating functions in application resources according to some embodiments. In some embodiments, application 110 performs process 800. Process 800 begins by receiving, at 810, a first request to perform a first function in a plurality of functions configured for execution by a web browser operating on a client device. The first function is implemented by a second function on the mobile device using native code. The second function is configured to emulate the first function. Referring to FIG. 1 as an example, PD & E manager 140 may be executing application resources and received the first request to perform the first function. In response to the first request, process 800 then performs, at 820, the second function. Referring to FIG. 1 as an example, PD & E manager 140 can detect the first request and direct execution to the second function, which is a function configured to emulate the first function, causing PD & E manager 140 to perform the second function.

Next, process 800 receives, at 830, a second request to perform a third function in the plurality of functions. The third function is implemented by a fourth function on the mobile device using scripting code compliant with a defined scripting standard. The fourth function is configured to emulate the third function. Referring to FIG. 1 as an example, while PD & E manager 140 continues to execute application resources, PD & E manager 140 receives the second request to perform the third function. Finally, in response to the second request, process 800 performs, at 840, the fourth function. Referring to FIG. 1 as an example, PD & E manager 140 can detect the second request and direct execution to the fourth function, which is a function configured to emulate the third function. This results in PD & E manager 140 performing the fourth function.

Figure 9:
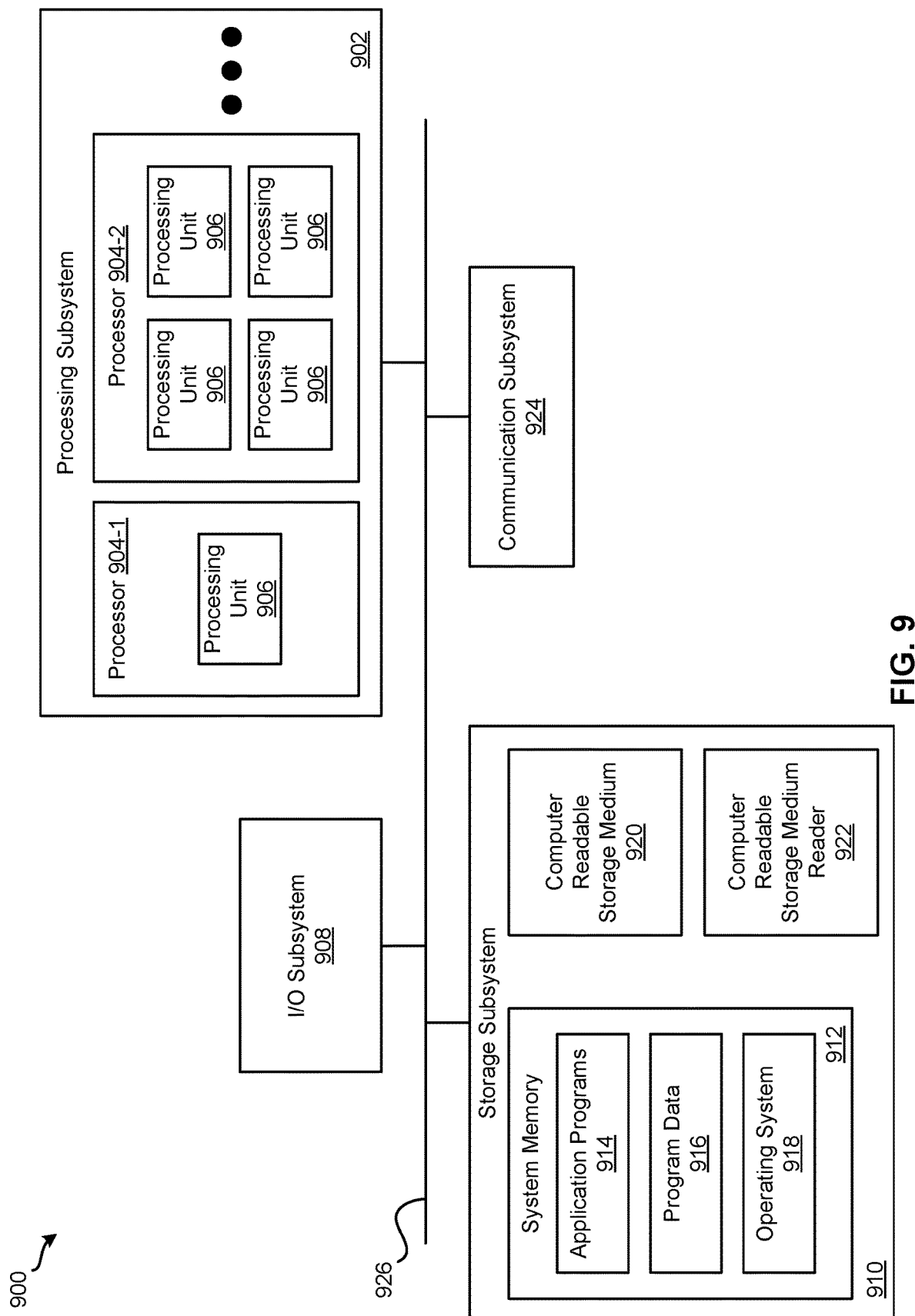
FIG. 9 illustrates an exemplary computer system, in which various embodiments may be implemented.

FIG. 9 illustrates an exemplary computer system 900 for implementing various embodiments described above. For example, computer system 900 may be used to implement computing system 165 and client device 185. Computer system 900 may be a desktop computer, a laptop, a server computer, or any other type of computer system or combination thereof. Some or all elements of web browser 190, application 170, or combinations thereof can be included or implemented in computer system 900. As shown in FIG. 9, computer system 900 includes processing subsystem 902, which communicates, via bus subsystem 926, with input/output (I/O) subsystem 908, storage subsystem 910 and communication subsystem 924.

Bus subsystem 926 is configured to facilitate communication among the various components and subsystems of computer system 900. While bus subsystem 926 is illustrated in FIG. 9 as a single bus, one of ordinary skill in the art will understand that bus subsystem 926 may be implemented as multiple buses. Bus subsystem 926 may be any of several types of bus structures (e.g., a memory bus or memory controller, a peripheral bus, a local bus, etc.) using any of a variety of bus architectures. Examples of bus architectures may include an Industry Standard Architecture (ISA) bus, a Micro Channel Architecture (MCA) bus, an Enhanced ISA (EISA) bus, a Video Electronics Standards Association (VESA) local bus, a Peripheral Component Interconnect (PCI) bus, a Universal Serial Bus (USB), etc.

Processing subsystem 902, which can be implemented as one or more integrated circuits (e.g., a conventional microprocessor or microcontroller), controls the operation of computer system 900. Processing subsystem 902 may include one or more processors 904. Each processor 904 may include one processing unit 906 (e.g., a single core processor such as processor 904-1) or several processing units 906 (e.g., a multicore processor such as processor 904-2). In some embodiments, processors 904 of processing subsystem 902 may be implemented as independent processors while, in other embodiments, processors 904 of processing subsystem 902 may be implemented as multiple processors integrate into a single chip or multiple chips. Still, in some embodiments, processors 904 of processing subsystem 902 may be implemented as a combination of independent processors and multiple processors integrated into a single chip or multiple chips.

In some embodiments, processing subsystem 902 can execute a variety of programs or processes in response to program code and can maintain multiple concurrently executing programs or processes. At any given time, some or all of the program code to be executed can reside in processing subsystem 902 and/or in storage subsystem 910. Through suitable programming, processing subsystem 902 can provide various functionalities.

I/O subsystem 908 may include any number of user interface input devices and/or user interface output devices. User interface input devices may include a keyboard, pointing devices (e.g., a mouse, a trackball, etc.), a touchpad, a touch screen incorporated into a display, a scroll wheel, a click wheel, a dial, a button, a switch, a keypad, audio input devices with voice recognition systems, microphones, image/video capture devices (e.g., webcams, image scanners, barcode readers, etc.), motion sensing devices, gesture recognition devices, eye gesture (e.g., blinking) recognition devices, biometric input devices, and/or any other types of input devices.

User interface output devices may include visual output devices (e.g., a display subsystem, indicator lights, etc.), audio output devices (e.g., speakers, headphones, etc.), etc. Examples of a display subsystem may include a cathode ray tube (CRT), a flat-panel device (e.g., a liquid crystal display (LCD), a plasma display, etc.), a projection device, a touch screen, and/or any other types of devices and mechanisms for outputting information from computer system 900 to a user or another device (e.g., a printer).

As illustrated in FIG. 9, storage subsystem 910 includes system memory 912, computer-readable storage medium 920, and computer-readable storage medium reader 922. System memory 912 may be configured to store software in the form of program instructions that are loadable and executable by processing subsystem 902 as well as data generated during the execution of program instructions. In some embodiments, system memory 912 may include volatile memory (e.g., random access memory (RAM)) and/or non-volatile memory (e.g., read-only memory (ROM), programmable read-only memory (PROM), erasable programmable read-only memory (EPROM), electrically erasable programmable read-only memory (EEPROM), flash memory, etc.). System memory 912 may include different types of memory, such as static random access memory (SRAM) and/or dynamic random access memory (DRAM). System memory 912 may include a basic input/output system (BIOS), in some embodiments, that is configured to store basic routines to facilitate transferring information between elements within computer system 900 (e.g., during start-up). Such a BIOS may be stored in ROM (e.g., a ROM chip), flash memory, or any other type of memory that may be configured to store the BIOS.

As shown in FIG. 9, system memory 912 includes application programs 914 (e.g., application 170), program data 916, and operating system (OS) 918. OS 918 may be one of various versions of Microsoft Windows, Apple Mac OS, Apple OS X, Apple macOS, and/or Linux operating systems, a variety of commercially-available UNIX or UNIX-like operating systems (including without limitation the variety of GNU/Linux operating systems, the Google Chrome® OS, and the like) and/or mobile operating systems such as Apple iOS, Windows Phone, Windows Mobile, Android, BlackBerry OS, Blackberry 10, and Palm OS, WebOS operating systems.

Computer-readable storage medium 920 may be a non-transitory computer-readable medium configured to store software (e.g., programs, code modules, data constructs, instructions, etc.). Many of the components and/or processes described above may be implemented as software that when executed by a processor or processing unit (e.g., a processor or processing unit of processing subsystem 902) performs the operations of such components and/or processes. Storage subsystem 910 may also store data used for, or generated during, the execution of the software.

Storage subsystem 910 may also include computer-readable storage medium reader 922 that is configured to communicate with computer-readable storage medium 920. Together and, optionally, in combination with system memory 912, computer-readable storage medium 920 may comprehensively represent remote, local, fixed, and/or removable storage devices plus storage media for temporarily and/or more permanently containing, storing, transmitting, and retrieving computer-readable information.

Computer-readable storage medium 920 may be any appropriate media known or used in the art, including storage media such as volatile, non-volatile, removable, non-removable media implemented in any method or technology for storage and/or transmission of information. Examples of such storage media includes RAM, ROM, EEPROM, flash memory or other memory technology, compact disc read-only memory (CD-ROM), digital versatile disk (DVD), Blu-ray Disc (BD), magnetic cassettes, magnetic tape, magnetic disk storage (e.g., hard disk drives), Zip drives, solid-state drives (SSD), flash memory card (e.g., secure digital (SD) cards, CompactFlash cards, etc.), USB flash drives, or any other type of computer-readable storage media or device.

Communication subsystem 924 serves as an interface for receiving data from, and transmitting data to, other devices, computer systems, and networks. For example, communication subsystem 924 may allow computer system 900 to connect to one or more devices via a network (e.g., a personal area network (PAN), a local area network (LAN), a storage area network (SAN), a campus area network (CAN), a metropolitan area network (MAN), a wide area network (WAN), a global area network (GAN), an intranet, the Internet, a network of any number of different types of networks, etc.). Communication subsystem 924 can include any number of different communication components. Examples of such components may include radio frequency (RF) transceiver components for accessing wireless voice and/or data networks (e.g., using cellular technologies such as 2G, 3G, 4G, 5G, etc., wireless data technologies such as Wi-Fi, Bluetooth, ZigBee, etc., or any combination thereof), global positioning system (GPS) receiver components, and/or other components. In some embodiments, communication subsystem 924 may provide components configured for wired communication (e.g., Ethernet) in addition to or instead of components configured for wireless communication.

One of ordinary skill in the art will realize that the architecture shown in FIG. 9 is only an example architecture of computer system 900, and that computer system 900 may have additional or fewer components than shown, or a different configuration of components. The various components shown in FIG. 9 may be implemented in hardware, software, firmware or any combination thereof, including one or more signal processing and/or application specific integrated circuits.

Figure 10:
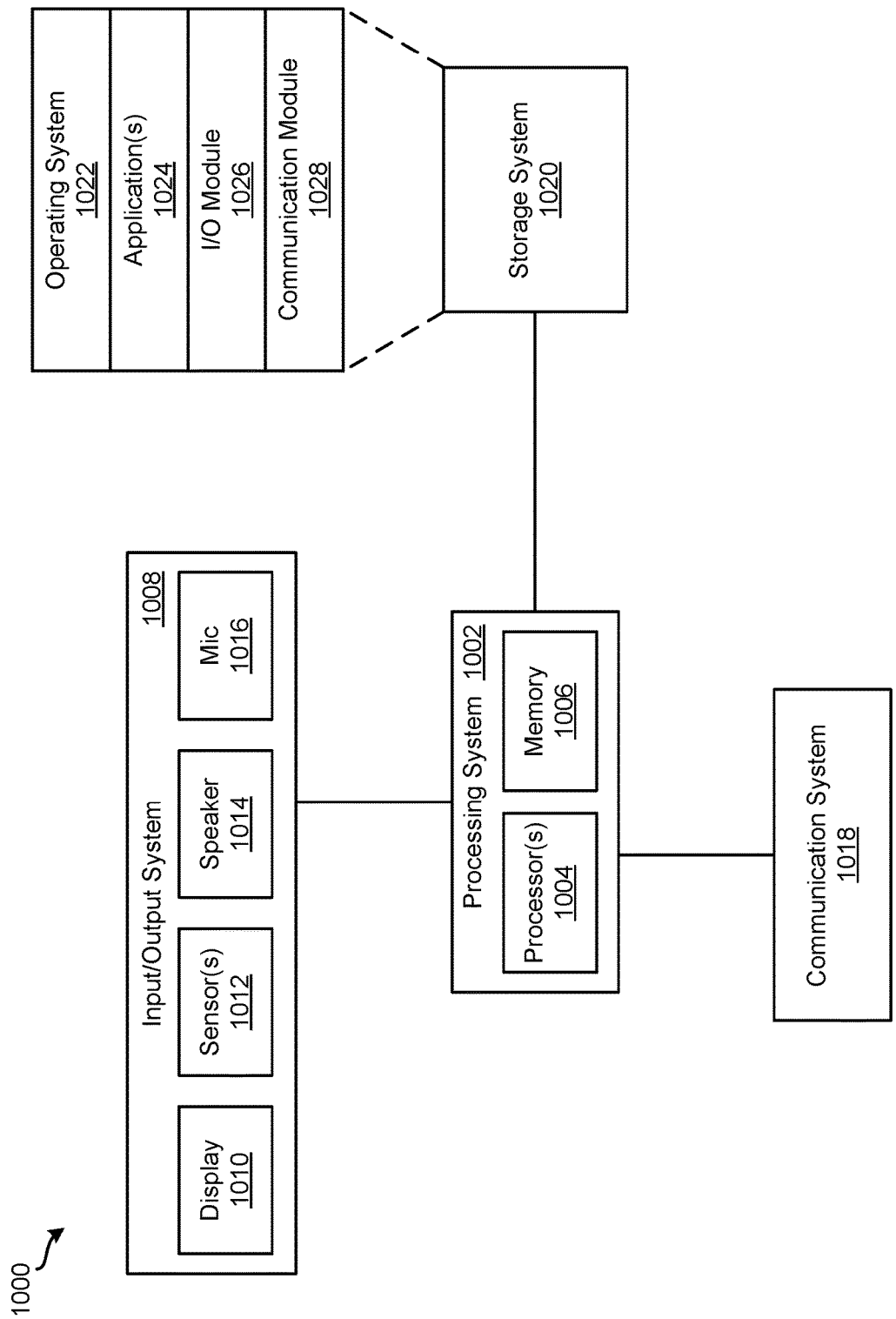
FIG. 10 illustrates an exemplary computing device, in which various embodiments may be implemented.

FIG. 10 illustrates an exemplary computing device 1000 for implementing various embodiments described above. For example, computing device 1000 may be used to implement mobile device 105 and client device 185. Computing device 1000 may be a cellphone, a smartphone, a wearable device, an activity tracker or manager, a tablet, a personal digital assistant (PDA), a media player, or any other type of mobile computing device or combination thereof. Some or all elements of application 110, visualization definition manager 115, webview manager 120, webviews 125*a-n*, cube manager 130, remote connection manager 135, PD & E manager 140, query manager 145, network manager 150, or combinations thereof can be included or implemented in computing device 1000. In addition, computing device 1000 can implement many of the operations, methods, and/or processes described above (e.g., process 300, process 500, process 700, and process 800). As shown in FIG. 10, computing device 1000 includes processing system 1002, input/output (I/O) system 1008, communication system 1018, and storage system 1020. These components may be coupled by one or more communication buses or signal lines.

Processing system 1002, which can be implemented as one or more integrated circuits (e.g., a conventional microprocessor or microcontroller), controls the operation of computing device 1000. As shown, processing system 1002 includes one or more processors 1004 and memory 1006. Processors 1004 are configured to run or execute various software and/or sets of instructions stored in memory 1006 to perform various functions for computing device 1000 and to process data.

Each processor of processors 1004 may include one processing unit (e.g., a single core processor) or several processing units (e.g., a multicore processor). In some embodiments, processors 1004 of processing system 1002 may be implemented as independent processors while, in other embodiments, processors 1004 of processing system 1002 may be implemented as multiple processors integrate into a single chip. Still, in some embodiments, processors 1004 of processing system 1002 may be implemented as a combination of independent processors and multiple processors integrated into a single chip.

Memory 1006 may be configured to receive and store software (e.g., operating system 1022, applications 1024, I/O module 1026, communication module 1028, etc. from storage system 1020) in the form of program instructions that are loadable and executable by processors 1004 as well as data generated during the execution of program instructions. In some embodiments, memory 1006 may include volatile memory (e.g., random access memory (RAM)), non-volatile memory (e.g., read-only memory (ROM), programmable read-only memory (PROM), erasable programmable read-only memory (EPROM), electrically erasable programmable read-only memory (EEPROM), flash memory, etc.), or a combination thereof.

I/O system 1008 is responsible for receiving input through various components and providing output through various components. As shown for this example, I/O system 1008 includes display 1010, one or more sensors 1012, speaker 1014, and microphone 1016. Display 1010 is configured to output visual information (e.g., a graphical user interface (GUI) generated and/or rendered by processors 1004). In some embodiments, display 1010 is a touch screen that is configured to also receive touch-based input. Display 1010 may be implemented using liquid crystal display (LCD) technology, light-emitting diode (LED) technology, organic LED (OLED) technology, organic electro luminescence (OEL) technology, or any other type of display technologies. Sensors 1012 may include any number of different types of sensors for measuring a physical quantity (e.g., temperature, force, pressure, acceleration, orientation, light, radiation, etc.). Speaker 1014 is configured to output audio information and microphone 1016 is configured to receive audio input. One of ordinary skill in the art will appreciate that I/O system 1008 may include any number of additional, fewer, and/or different components. For instance, I/O system 1008 may include a keypad or keyboard for receiving input, a port for transmitting data, receiving data and/or power, and/or communicating with another device or component, an image capture component for capturing photos and/or videos, etc.

Communication system 1018 serves as an interface for receiving data from, and transmitting data to, other devices, computer systems, and networks. For example, communication system 1018 may allow computing device 1000 to connect to one or more devices via a network (e.g., a personal area network (PAN), a local area network (LAN), a storage area network (SAN), a campus area network (CAN), a metropolitan area network (MAN), a wide area network (WAN), a global area network (GAN), an intranet, the Internet, a network of any number of different types of networks, etc.). Communication system 1018 can include any number of different communication components. Examples of such components may include radio frequency (RF) transceiver components for accessing wireless voice and/or data networks (e.g., using cellular technologies such as 2G, 3G, 4G, 5G, etc., wireless data technologies such as Wi-Fi, Bluetooth, ZigBee, etc., or any combination thereof), global positioning system (GPS) receiver components, and/or other components. In some embodiments, communication system 1018 may provide components configured for wired communication (e.g., Ethernet) in addition to or instead of components configured for wireless communication.

Storage system 1020 handles the storage and management of data for computing device 1000. Storage system 1020 may be implemented by one or more non-transitory machine-readable mediums that are configured to store software (e.g., programs, code modules, data constructs, instructions, etc.) and store data used for, or generated during, the execution of the software. Many of the components (e.g., application 110, visualization definition manager 115, webview manager 120, webviews 125*a*-*n*, cube manager 130, remote connection manager 135, PD & E manager 140, query manager 145, and network manager 150) and/or processes (e.g., process 300, process 500, process 700, and process 800) described above may be implemented as software that when executed by a processor or processing unit (e.g., processors 1004 of processing system 1002) performs the operations of such components and/or processes.

In this example, storage system 1020 includes operating system 1022, one or more applications 1024, I/O module 1026, and communication module 1028. Operating system 1022 includes various procedures, sets of instructions, software components and/or drivers for controlling and managing general system tasks (e.g., memory management, storage device control, power management, etc.) and facilitates communication between various hardware and software components. Operating system 1022 may be one of various versions of Microsoft Windows, Apple Mac OS, Apple OS X, Apple macOS, and/or Linux operating systems, a variety of commercially-available UNIX or UNIX-like operating systems (including without limitation the variety of GNU/Linux operating systems, the Google Chrome® OS, and the like) and/or mobile operating systems such as Apple iOS, Windows Phone, Windows Mobile, Android, BlackBerry OS, Blackberry 10, and Palm OS, WebOS operating systems.

Applications 1024 can include any number of different applications installed on computing device 1000. For example, application 110 may be installed on computing device 1000. Other examples of such applications may include a browser application, an address book application, a contact list application, an email application, an instant messaging application, a word processing application, JAVA-enabled applications, an encryption application, a digital rights management application, a voice recognition application, location determination application, a mapping application, a music player application, etc.

I/O module 1026 manages information received via input components (e.g., display 1010, sensors 1012, and microphone 1016) and information to be outputted via output components (e.g., display 1010 and speaker 1014). Communication module 1028 facilitates communication with other devices via communication system 1018 and includes various software components for handling data received from communication system 1018.

One of ordinary skill in the art will realize that the architecture shown in FIG. 10 is only an example architecture of computing device 1000, and that computing device 1000 may have additional or fewer components than shown, or a different configuration of components. The various components shown in FIG. 10 may be implemented in hardware, software, firmware or any combination thereof, including one or more signal processing and/or application specific integrated circuits.

Figure 11:
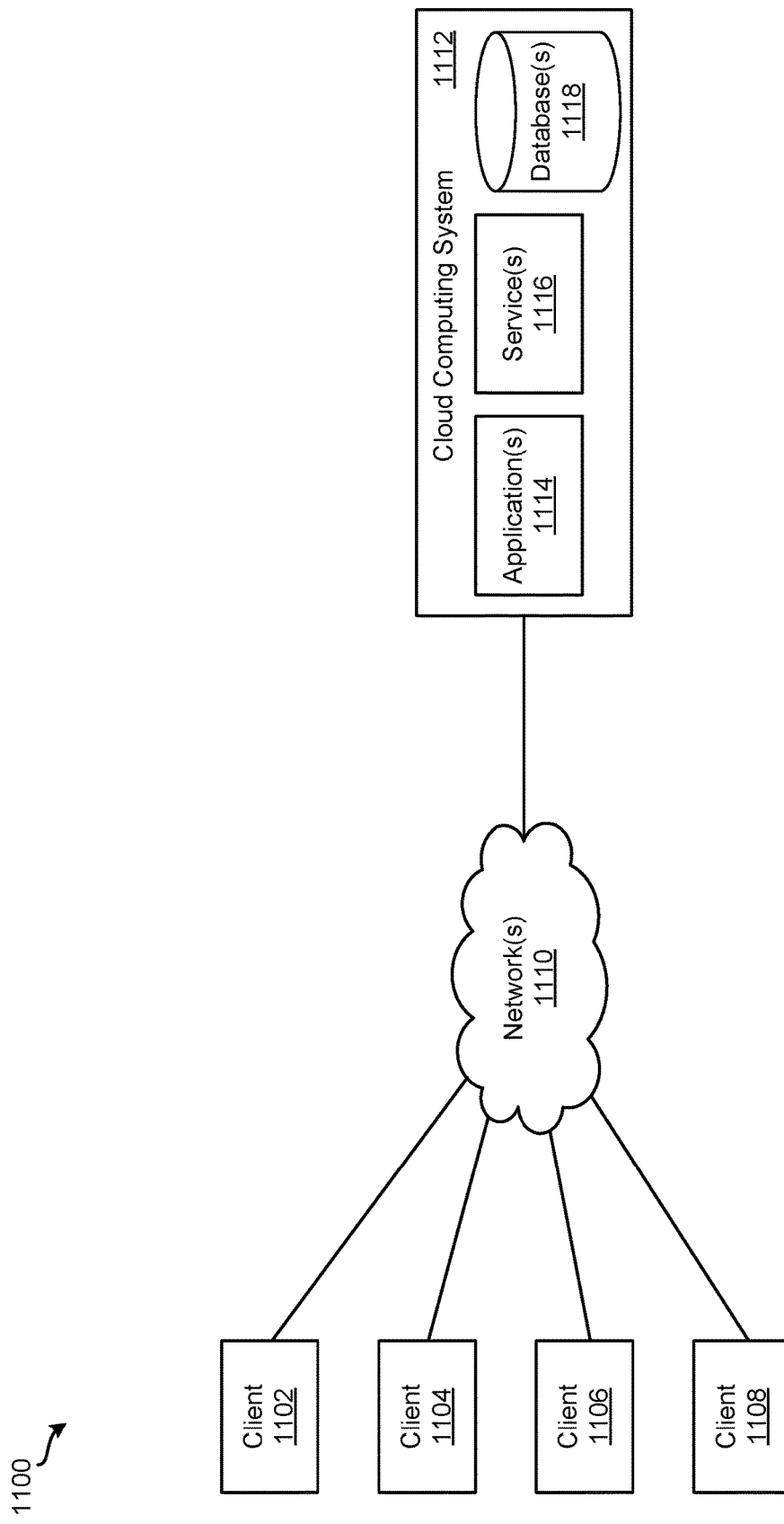
FIG. 11 illustrates an exemplary system, in which various embodiments may be implemented.

FIG. 11 illustrates an exemplary system 1100 for implementing various embodiments described above. For example, client devices 1102-1108 may be used to implement mobile device 110 and client device 185 and cloud computing system 1112 may be used to implement computing system 165. As shown, system 1100 includes client devices 1102-1108, one or more networks 1110, and cloud computing system 1112. Cloud computing system 1112 is configured to provide resources and data to client devices 1102-1108 via networks 1110. In some embodiments, cloud computing system 1100 provides resources to any number of different users (e.g., customers, tenants, organizations, etc.). Cloud computing system 1112 may be implemented by one or more computer systems (e.g., servers), virtual machines operating on a computer system, or a combination thereof.

As shown, cloud computing system 1112 includes one or more applications 1114, one or more services 1116, and one or more databases 1118. Cloud computing system 1100 may provide applications 1114, services 1116, and databases 1118 to any number of different customers in a self-service, subscription-based, elastically scalable, reliable, highly available, and secure manner.

In some embodiments, cloud computing system 1100 may be adapted to automatically provision, manage, and track a customer's subscriptions to services offered by cloud computing system 1100. Cloud computing system 1100 may provide cloud services via different deployment models. For example, cloud services may be provided under a public cloud model in which cloud computing system 1100 is owned by an organization selling cloud services and the cloud services are made available to the general public or different industry enterprises. As another example, cloud services may be provided under a private cloud model in which cloud computing system 1100 is operated solely for a single organization and may provide cloud services for one or more entities within the organization. The cloud services may also be provided under a community cloud model in which cloud computing system 1100 and the cloud services provided by cloud computing system 1100 are shared by several organizations in a related community. The cloud services may also be provided under a hybrid cloud model, which is a combination of two or more of the aforementioned different models.

In some instances, any one of applications 1114, services 1116, and databases 1118 made available to client devices 1102-1108 via networks 1110 from cloud computing system 1100 is referred to as a "cloud service." Typically, servers and systems that make up cloud computing system 1100 are different from the on-premises servers and systems of a customer. For example, cloud computing system 1100 may host an application and a user of one of client devices 1102-1108 may order and use the application via networks 1110.

Applications 1114 may include software applications that are configured to execute on cloud computing system 1112 (e.g., a computer system or a virtual machine operating on a computer system) and be accessed, controlled, managed, etc. via client devices 1102-1108. In some embodiments, applications 1114 may include server applications and/or mid-tier applications (e.g., HTTP (hypertext transport protocol) server applications, FTP (file transfer protocol) server applications, CGI (common gateway interface) server applications, JAVA server applications, etc.). Services 1116 are software components, modules, application, etc. that are configured to execute on cloud computing system 1112 and provide functionalities to client devices 1102-1108 via networks 1110. Services 1116 may be web-based services or on-demand cloud services.

Databases 1118 are configured to store and/or manage data that is accessed by applications 1114, services 1116, and/or client devices 1102-1108. For instance, storages 175 and 180 may be stored in databases 1118. Databases 1118 may reside on a non-transitory storage medium local to (and/or resident in) cloud computing system 1112, in a storage-area network (SAN), on a non-transitory storage medium local located remotely from cloud computing system 1112. In some embodiments, databases 1118 may include relational databases that are managed by a relational database management system (RDBMS). Databases 1118 may be a column-oriented databases, row-oriented databases, or a combination thereof. In some embodiments, some or all of databases 1118 are in-memory databases. That is, in some such embodiments, data for databases 1118 are stored and managed in memory (e.g., random access memory (RAM)).

Client devices 1102-1108 are configured to execute and operate a client application (e.g., a web browser, a proprietary client application, etc.) that communicates with applications 1114, services 1116, and/or databases 1118 via networks 1110. This way, client devices 1102-1108 may access the various functionalities provided by applications 1114, services 1116, and databases 1118 while applications 1114, services 1116, and databases 1118 are operating (e.g., hosted) on cloud computing system 1100. Client devices 1102-1108 may be computer system 900 or computing device 1000, as described above by reference to FIGS. 9 and 10, respectively. Although system 1100 is shown with four client devices, any number of client devices may be supported.

Networks 1110 may be any type of network configured to facilitate data communications among client devices 1102-1108 and cloud computing system 1112 using any of a variety of network protocols. Networks 1110 may be a personal area network (PAN), a local area network (LAN), a storage area network (SAN), a campus area network (CAN), a metropolitan area network (MAN), a wide area network (WAN), a global area network (GAN), an intranet, the Internet, a network of any number of different types of networks, etc.

The above description illustrates various embodiments of the present invention along with examples of how aspects of the present invention may be implemented. The above examples and embodiments should not be deemed to be the only embodiments, and are presented to illustrate the flexibility and advantages of the present invention as defined by the following claims. Based on the above disclosure and the following claims, other arrangements, embodiments, implementations and equivalents will be evident to those skilled in the art and may be employed without departing from the spirit and scope of the invention as defined by the claims.

What is claimed is:

1. A non-transitory machine-readable medium storing a program executable by at least one processing unit of a mobile device, the program comprising sets of instructions for:
    receiving a visualization collection definition specifying a visualization definition for each visualization in a plurality of visualizations, each visualization definition including a visualization type;
    processing a first visualization in the plurality of visualization using a main processing thread;
    while processing the first visualization, retrieving data for a second visualization in the plurality of visualizations from a computing system using a background processing thread;
    storing the data for the second visualization in a cache storage of the mobile device; and
    after the processing of the first visualization is completed, processing the second visualization using the main processing thread, wherein processing the second visualization comprises:
        retrieving the data for the second visualization from the cache storage, and
        generating the second visualization based on the retrieved data for the second visualization.

2. The non-transitory machine-readable medium of claim 1, wherein retrieving data for the second visualization in the plurality of visualizations from the computing system comprises generating a query for the data for the second visualization, sending the query to the computing system, and receiving the data for the second visualization from the computing system.

3. The non-transitory machine-readable medium of claim 1, wherein the program further comprises retrieving data for the first visualization from the computing system using the background processing thread, wherein processing the first visualization in the plurality of visualizations using the main processing thread comprises generating the first visualization based on the retrieved data for the first visualization.

4. The non-transitory machine-readable medium of claim 3, wherein retrieving data for the first visualization from the computing system comprises generating a query for the data for the first visualization, sending the query to the computing system, and receiving the data for the first visualization from the computing system.

5. The non-transitory machine-readable medium of claim 1, wherein the program further comprises sets of instructions for:
while processing the first visualization, retrieving data for a third visualization in the plurality of visualizations from the computing system using the background processing thread; and
after the processing of the first visualization is completed, processing the third visualization using the main processing thread.

6. The non-transitory machine-readable medium of claim 5, wherein retrieving data for the second visualization in the plurality of visualizations and retrieving data for the third visualization in the plurality of visualizations are retrieved in a single batch.

7. The non-transitory machine-readable medium of claim 1, wherein the program further comprises a set of instructions for:
while processing the second visualization, retrieving data for a third visualization in the plurality of visualizations from the cache storage.

8. A method, executable by a mobile device, comprising:
receiving a visualization collection definition specifying a visualization definition for each visualization in a plurality of visualizations, each visualization definition including a visualization type;
processing a first visualization in the plurality of visualization using a main processing thread;
while processing the first visualization, retrieving data for a second visualization in the plurality of visualizations from a computing system using a background processing thread;
storing the data for the second visualization in a cache storage of the mobile device; and
after the processing of the first visualization is completed, processing the second visualization using the main processing thread, wherein processing the second visualization comprises:
retrieving the data for the second visualization from the cache storage, and
generating the second visualization based on the retrieved data for the second visualization.

9. The method of claim 8, wherein retrieving data for the second visualization in the plurality of visualizations from the computing system comprises generating a query for the data for the second visualization, sending the query to the computing system, and receiving the data for the second visualization from the computing system.

10. The method of claim 8 further comprising retrieving data for the first visualization from the computing system using the background processing thread, wherein processing the first visualization in the plurality of visualizations using the main processing thread comprises generating the first visualization based on the retrieved data for the first visualization.

11. The method of claim 10, wherein retrieving data for the first visualization from the computing system comprises generating a query for the data for the first visualization, sending the query to the computing system, and receiving the data for the first visualization from the computing system.

12. The method of claim 8 further comprising:
while processing the first visualization, retrieving data for a third visualization in the plurality of visualizations from the computing system using the background processing thread; and
after the processing of the first visualization is completed, processing the third visualization using the main processing thread.

13. The method of claim 12, wherein retrieving data for the second visualization in the plurality of visualizations and retrieving data for the third visualization in the plurality of visualizations are retrieved in a single batch.

14. The method of claim 8 further comprising:
while processing the second visualization, retrieving data for a third visualization in the plurality of visualizations from the cache storage.

15. A system comprising:
a set of processing units;
a cache storage; and
a non-transitory machine-readable medium storing instructions that when executed by at least one processing unit in the set of processing units cause the at least one processing unit to:
receive a visualization collection definition specifying a visualization definition for each visualization in a plurality of visualizations, each visualization definition including a visualization type;
process a first visualization in the plurality of visualization using a main processing thread;
while processing the first visualization, retrieve data for a second visualization in the plurality of visualizations from a computing system using a background processing thread;
storing the data for the second visualization in the cache storage; and
after the processing of the first visualization is completed, process the second visualization using the main processing thread, wherein processing the second visualization comprises:
retrieving the data for the second visualization from the cache storage, and
generating the second visualization based on the retrieved data for the second visualization.

16. The system of claim 15, wherein retrieving data for the second visualization in the plurality of visualizations from the computing system comprises generating a query for the data for the second visualization, sending the query to the computing system, and receiving the data for the second visualization from the computing system.

17. The system of claim 15, wherein the instructions further cause the at least one processing unit to retrieve data for the first visualization from the computing system using the background processing thread, wherein processing the first visualization in the plurality of visualizations using the main processing thread comprises generating the first visualization based on the retrieved data for the first visualization.

18. The system of claim 17, wherein retrieving data for the first visualization from the computing system comprises generating a query for the data for the first visualization, sending the query to the computing system, and receiving the data for the first visualization from the computing system.

19. The system of claim 15, wherein the instructions further cause the at least one processing unit to:
- while processing the first visualization, retrieve data for a third visualization in the plurality of visualizations from the computing system using the background processing thread; and
- after the processing of the first visualization is completed, process the third visualization using the main processing thread.

20. The system of claim 15, wherein the instructions further cause the at least one processing unit to:
- while processing the second visualization, retrieving data for a third visualization in the plurality of visualizations from the cache storage.

* * * * *